United States Patent
Gandhewar et al.

(10) Patent No.: US 8,285,875 B2
(45) Date of Patent: Oct. 9, 2012

(54) SYNCHRONIZING RESOURCE BINDINGS WITHIN COMPUTER NETWORK

(75) Inventors: Sunil Gandhewar, Nashua, NH (US); John Liddy, Gardner, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 226 days.

(21) Appl. No.: 12/731,984

(22) Filed: Mar. 25, 2010

(65) Prior Publication Data

US 2010/0191839 A1    Jul. 29, 2010

Related U.S. Application Data

(63) Continuation-in-part of application No. 12/367,319, filed on Feb. 6, 2009, now Pat. No. 8,086,713.

(60) Provisional application No. 61/147,912, filed on Jan. 28, 2009.

(51) Int. Cl.
*G06F 15/16* (2006.01)
(52) U.S. Cl. ......... 709/245; 370/350; 370/409; 370/252
(58) Field of Classification Search .................. 709/220, 709/221, 223; 370/350, 409, 252; 235/451
See application file for complete search history.

(56) References Cited

U.S. PATENT DOCUMENTS

| | | | |
|---|---|---|---|
| 6,578,074 B1 | 6/2003 | Bahlmann | |
| 6,957,276 B1 | 10/2005 | Bahl | |
| 6,982,953 B1 | 1/2006 | Swales | |
| 7,178,059 B2 | 2/2007 | Greenspan et al. | |
| 7,292,538 B1* | 11/2007 | O'Rourke et al. | 370/252 |
| 7,321,893 B1 | 1/2008 | Rambacher et al. | |
| 7,386,629 B2 | 6/2008 | Rover et al. | |
| 7,533,165 B2 | 5/2009 | Makino | |
| 7,624,181 B2 | 11/2009 | Townsley et al. | |
| 7,648,070 B2* | 1/2010 | Droms et al. | 235/451 |
| 7,792,942 B1* | 9/2010 | Regan et al. | 709/223 |
| 7,991,863 B2* | 8/2011 | Zhao | 709/221 |
| 8,036,237 B2* | 10/2011 | Kolli et al. | 370/409 |
| 2005/0253718 A1 | 11/2005 | Droms et al. | |
| 2005/0253722 A1 | 11/2005 | Droms et al. | |
| 2005/0286518 A1 | 12/2005 | Park et al. | |
| 2006/0031488 A1 | 2/2006 | Swales | |
| 2006/0047791 A1 | 3/2006 | Bahl | |

(Continued)

OTHER PUBLICATIONS

Reynolds et al., "Assigned Numbers," RFC 1700, Oct. 1994, 215 pp.

(Continued)

*Primary Examiner* — Dustin Nguyen
(74) *Attorney, Agent, or Firm* — Shumaker & Sieffert, P.A.

(57) ABSTRACT

In general, techniques are described for synchronizing resource bindings within computer networks. An intermediate network device comprising an interface card and a control unit may implement these techniques. The interface card receives a message from a server that allocates a network address for use by a client device identified by a unique identifier. The control unit stores data defining a binding between the unique identifier and the network address. The control unit includes a binding synchronization module that determines, based on a determination to release the binding, whether the binding release occurs in response to receiving a release message from the client device, and automatically generates a release message on behalf of the client device upon determining that the binding release did not occur in response to receiving a release message. The binding synchronization module outputs the automatically generated release message to the server that reserved the L3 network address.

31 Claims, 8 Drawing Sheets

U.S. PATENT DOCUMENTS

| | | | |
|---|---|---|---|
| 2006/0155563 | A1 | 7/2006 | Banerjee et al. |
| 2006/0221846 | A1 | 10/2006 | Dyck et al. |
| 2007/0002833 | A1 | 1/2007 | Bajic |
| 2007/0180499 | A1 | 8/2007 | Van Bemmel |
| 2007/0203999 | A1 | 8/2007 | Townsley et al. |
| 2007/0214352 | A1 | 9/2007 | Convery et al. |
| 2008/0046597 | A1 | 2/2008 | Stademann et al. |
| 2008/0065747 | A1* | 3/2008 | Kubota ............ 709/220 |
| 2009/0092045 | A1 | 4/2009 | Wu et al. |
| 2009/0257425 | A1* | 10/2009 | Sastry et al. ........ 370/350 |
| 2010/0042707 | A1 | 2/2010 | Zhao |
| 2010/0042714 | A1 | 2/2010 | Choi et al. |
| 2010/0191813 | A1 | 7/2010 | Gandhewar et al. |

OTHER PUBLICATIONS

Rigney et al., "Remote Authentication Dial in User Service (Radius)," RFC 2865, Jun. 2000, 71 pp.

Droms, R. et al., "Dynamic Host Configuration Protocol for IPv6 (DHCPv6)," RFC 3315, IETF Standard, Internet Engineering Task Force, Jul. 2003, 17 pp.

Lai, K., "Change (Spoof) MAC Address on Windows 2000, XP, 2003, VISTA, 2008, Windows 7," KLC Consulting, Inc., May 2007, retrieved from the internet: URL: http://www.klcconsulting.net/change_mac_w2k.htm, 8 pp.

File Buzz, "Change Mac Address," retrieved from the internet: URL: http://www.filebuzz.com/files/Change_Mac_Address/1.html, 4 pp, last visited: Jul. 9, 2010.

File Buzz, "Gentle MAC Pro v4.0," Solar System Technologies, Jul. 4, 2007, retrieved from the internet: URL: http://www.filebuzz.com/fileinfo/32000/Gentle_MAC_Pro.html, 2 pp.

File Buzz, "MacIP Change v1.0," FUSION Soluciones Informaticas, Jul. 5, 2007, retrieved from the internet: URL: http://www.filebuzz.com/fileinfo/36702/MacIP_Change.html, 2 pp.

Juniper Networks, Inc., "JUNOS Software Subscriber Access Configuration Guide—DHCP Auto Logout Overview", Release 9.4, Jan. 15, 2009, retrieved from the internet: URL: http://www.juniper.net/techpubs/en_US/junos9.4/information-products/topic-collections/subscriber-access/swconfig-subscriber-access.pdf, 38 pp.

Droms, R., "Dynamic Host Configuration Protocol", RFC 2131, IETF Standard, Internet Engineering Task Force, Mar. 1997, 46 pp.

Alexander, S. et al., "DHCP Options and BOOTP Vendor Extensions", RFC 2132, IETF Standard, Internet Engineering Task Force, Mar. 1997, 35 pp.

Patrick, M., "DHCP Relay Agent Information Option", RFC 3046, IETF Standard, Internet Engineering Task Force, Jan. 2001, 15 pp.

Extended European Search Report for EP Application No. 10511210 dated Jun. 6, 2010, 7 pp.

Office Action from U.S. Appl. No. 12/367,319, dated Oct. 15, 2010, 25 pp.

Response to Office Action dated Oct. 15, 2010, from U.S. Appl. No. 12/367,319, filed Jan. 18, 2011, 27 pp.

* cited by examiner

SYNCHRONIZING RESOURCE BINDINGS WITHIN COMPUTER NETWORK

This application is continuation-in-part of application Ser. No. 12/367,319, filed Feb. 6, 2009, issued U.S. Pat. No. 8,086,713, which claims the benefit of U.S. Provisional Application No. 61/147,912, filed Jan. 28, 2009, each of which are hereby incorporated by reference as if fully set forth herein.

TECHNICAL FIELD

The invention relates to computer networks and, more particularly, reserving resources for use by network devices within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

To route the packets through the computer network, each network device may be assigned an address that uniquely identifies each of the requesting network devices. Each packet may then include a source address uniquely identifying the network device that originated the packet and a destination address uniquely identifying the network device to which the packet is destined. Intermediate devices, referred to as routers, may route the packets to the destination device based on the destination address included within the packet.

Typically, each network device, upon attempting to access the network, may request configuration information that includes an Internet Protocol (IP) address in accordance with a Dynamic Host Configuration Protocol (DHCP). For example, a subscriber device (e.g., a cable modem, a digital television setup box, a Digital Subscriber Line (DSL) modem) may request a layer three IP network address by issuing a DHCP request. A DHCP server that maintains an IP address space may receive this request, reserve an IP address with the IP address space, assign the IP address to the requesting network device, and forward a response back to the network device assigning the reserved IP address to the requesting network device. Often, the DCHP server may reserve the IP address for use by the requesting network device for a fixed, often long, duration of time. This "lease," as the reservation may commonly be referred, may extend for hours or possibly days, assuring the requesting network device of a pseudo-static IP address.

However, if, for some reason, the requesting network device is replaced with a different network device, the DHCP server may be unable to identify the replacement network device and, therefore, unable to reassign the lease with the requesting network device to the replacement network device. As a result, the replacement network device may request an address from the DHCP server, whereupon the DHCP server may reserve another IP address different from the IP address assigned to the replaced network device and assign the new other IP address to the replacement network device. The DHCP server may assign the new IP address without releasing the lease of the previous IP address to the replaced network device. In this respect, the DHCP server may inefficiently maintain the lease for the replaced network device even though this replaced network device no longer operates within the computer network.

Moreover, in some instances, the network employs a number of DHCP relay devices and/or DHCP relay-proxy devices that each relay the DHCP request and response messages between the network devices and the DHCP server across various intermediate sub-networks positioned intermediate to the network devices and the DHCP server. Commonly, each of these DHCP relay devices and/or DHCP relay-proxy devices stores data defining bindings identifying the IP address allocated to the various network devices. In these instances, one or more of these DHCP relay devices and/or DHCP server may be unable to detect that the original network device is no longer present in the network and update its data to remove the binding identifying the IP address allocated to the original network device. Consequently, the DHCP server and these other DHCP relay devices and/or DHCP relay-proxy devices may maintain bindings that are out of synchronization with those stored by the DHCP relay device or DHCP relay-proxy device located in the same sub-network as the original network device.

SUMMARY

In general, techniques are described for automatically synchronizing resource bindings stored by various network devices, such as DHCP relay devices, DHCP relay-proxy device and DHCP servers, of a computer network. The techniques enable a network device, such as a DHCP relay device or a DHCP relay-proxy device, to automatically generate a release message in response to determining that one or more network devices are no longer present in a given network. The DHCP relay device, for example, may automatically generate this release message and output this release message on behalf of a non-present, removed or replaced network device to a DHCP server that previously allocated a network resource, e.g., a layer 3 (L3) network address, for use by the network device without requiring any administrative or user input or intervention. Upon receiving this release message, the DHCP server or any intervening intermediate DHCP devices, such as a DHCP relay or relay-proxy device, updates its data storing the binding to remove the binding between the L3 network address and the removed network device, thereby effectively synchronizing the resource bindings stored by network the devices of the computer network.

In one embodiment, a method comprises receiving, with an intermediate network device positioned between a client device and a server in a network, an allocation message from the server that allocates a layer three (L3) network address for use by the client device identified by a unique identifier, storing, with the intermediate network device, data defining a binding between the unique identifier identifying the client device and the L3 network address reserved for use by the client device and determining, with the intermediate network device, whether to release the binding between the unique identifier identifying the client device and the L3 network address reserved for use by the client device. The method also comprises, based on the determination to release the binding, determining, with the intermediate network device, whether the binding release occurs in response to receiving a release message from the client device, automatically generating, with the intermediate network device, a release message on behalf of the client device upon determining that the binding release did not occur in response to receiving a release message from the client device, and outputting, with the intermediate network device, the automatically generated release message to the server that reserved the L3 network address for use by the client device identified by the unique identifier.

In another embodiment, an intermediate network device positioned between a client device and a server in a network comprises at least one interface card that receives an allocation message from the server that allocates a layer three (L3) network address for use by the client device identified by a unique identifier and a control unit that stores data defining a binding between the unique identifier identifying the client device and the L3 network address reserved for use by the client device. The control unit includes a binding synchronization module that determines whether to release the binding between the unique identifier identifying the client device and the L3 network address reserved for use by the client device, determines, based on the determination to release the binding, whether the binding release occurs in response to receiving a release message from the client device, automatically generates a release message on behalf of the client device upon determining that the binding release did not occur in response to receiving a release message from the client device, and outputs the automatically generated release message to the server that reserved the L3 network address for use by the client device identified by the unique identifier.

In another embodiment, a network system comprises a dynamic host configuration protocol (DHCP) client, a DHCP server that allocates L3 network addresses for use by DHCP clients, and at least one DHCP relay device positioned between the DHCP client device and the DHCP server. The at least one DHCP relay device comprises at least one interface card that receives a DHCP message from the DHCP server allocating a layer three (L3) network address for use by the DHCP client device identified by a unique identifier and a control unit that stores data defining a binding between the unique identifier identifying the DHCP client device and the L3 network address reserved for use by the DHCP client device. The control unit includes a binding synchronization module that determines whether to release the binding between the unique identifier identifying the DHCP client device and the L3 network address reserved for use by the DHCP client device, determines, based on the determination to release the binding, whether the binding release occurs in response to receiving a DHCP release message from the DHCP client device, automatically generates a DHCP release message on behalf of the client device upon determining that the binding release did not occur in response to receiving a DHCP release message from the DHCP client device, and outputs the automatically generated DHCP release message to the DHCP server that reserved the L3 network address for use by the DHCP client device identified by the unique identifier.

In another embodiment, a non-transitory computer-readable storage medium comprises instructions that cause a processor to receive, with an intermediate network device positioned between a client device and a server in a network, an allocation message from the server that allocates a layer three (L3) network address for use by the client device identified by a unique identifier, store, with the intermediate network device, data defining a binding between the unique identifier identifying the client device and the L3 network address reserved for use by the client device and determine, with the intermediate network device, whether to release the binding between the unique identifier identifying the client device and the L3 network address reserved for use by the client device. The instructions also cause the processor to, based on the determination to release the binding, determine, with the intermediate network device, whether the binding release occurs in response to receiving a release message from the client device, automatically generate, with the intermediate network device, a release message on behalf of the client device upon determining that the binding release did not occur in response to receiving a release message from the client device, and output, with the intermediate network device, the automatically generated release message to the server that reserved the L3 network address for use by the client device identified by the unique identifier.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
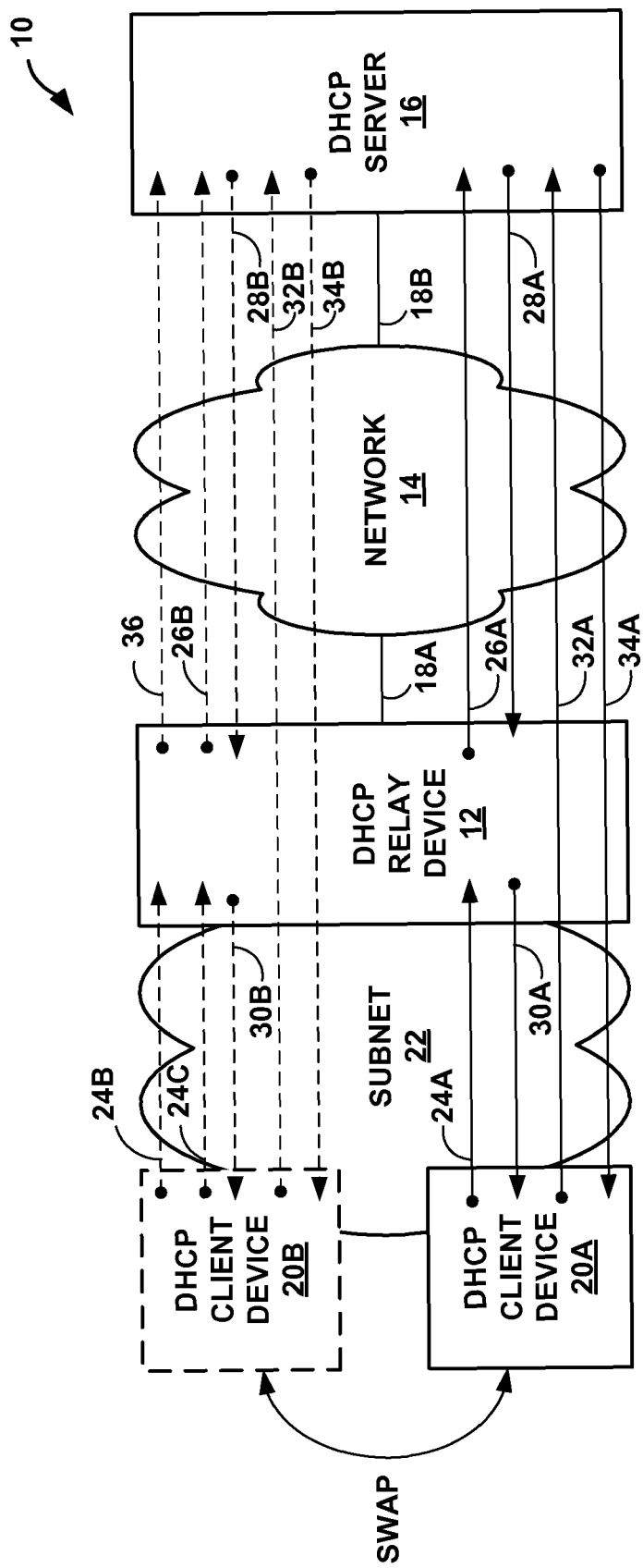
FIG. 1 is a block diagram illustrating an exemplary network system in which an intermediate DHCP relay device implements the automatic resource release techniques described in this disclosure.

FIG. 1 is a block diagram illustrating an exemplary network system 10 in which an intermediate network device 12 implements the automatic resource release techniques described in this disclosure. In the example of FIG. 1, device 12 is shown as a Dynamic Host Configuration Protocol (DHCP) relay device 12, however, the automatic resource release techniques may be implemented by any network device, such as a server, a router, a switch, a hub, a computer or any other device capable of receiving and communicating messages for the reservation of resources within a network system, such as network system 10. Moreover, while described with respect to a particular protocol for reserving resource, e.g., DHCP, the techniques may apply to any network address allocation protocol by which a network device may request and reserve network addresses for operating within network system 10.

As shown further in the example of FIG. 1, network system 10 includes a network 14 and a DHCP server 16, where DHCP relay device 12 and a DHCP server 16 couple to network 14 via respective network links 18A, 18B. Network 14 may represent any publicly accessible computer network, such as the Internet. Network 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. Typically, these devices communicate with one another via a packet-based protocol, such as an Internet Protocol (IP)/Transmission Control Protocol (TCP). As a result, network 14 may represent or be referred to as a "packet-based" or an "IP packet-based" computer network.

DHCP server 16 may represent a network device that allocates layer three network addresses (e.g., IP network addresses) for network system 10. In particular, DHCP server 16 may maintain access to an address pool, such as an Internet Protocol (IP) address pool. DHCP server 16 may also maintain access to other resources, such as configuration files that provide pertinent configuration information. DHCP server 16 may reserve an IP address within the IP address pool for use by one or more DHCP clients, such as DHCP client devices 20A, 20B ("DHCP client devices 20"), in accordance with DHCP, as described in more detail below.

Network system 10 may further include DHCP clients 20, each of which couple to DHCP relay 12 via one or more connections (not shown) included within sub-network 22 ("subnet 22"). DHCP client devices 20 may each represent a subscriber device, such as one or more of a Set-Top Box (STB), a personal computer, a laptop computer, a modem, a workstation, a personal digital assistant (PDA), a cellular phone or other mobile device (e.g., a so-called "smart phone") or any other device capable of accessing a network, such as network 14. These devices 20 may be "DHCP clients" in that these devices implement DHCP to request, as a client to the DHCP server or host device 16, L3 network addresses (e.g., IP addresses) and other resources maintained by DHCP server 16 useful or required for operating within network system 10.

Subnet 22 may represent a portion of a larger network, which is not shown in FIG. 1 for ease of illustration purposes, hence the name "subnet." The larger network may be generally referred to as an access network in that this network enables client devices to access network 14. As subnet 22 comprises a portion of this access network and similarly facilitates access of network 14 by client devices 20, subnet 22 may similarly be referred to as an access network. Generally, access networks implement IP, and with respect to IP, subnets or IP subnets, such as subnet 22, may be identified by an IP address prefix.

An IP subnet may represent a "network area" in that the IP subnet may be identified by a contiguous set of IP addresses or an IP prefix that defines a distinct area within an IP address space of the larger access network. The IPv4 address space comprises $2^{32}$ distinct IP addresses, as each IP address may correspond to a 32-bit binary number. Typically, an IP address is presented in four eight bit binary numbers (or, in other words, four bytes) with each eight bit binary number or byte separated by a period (.), which is a notation referred to as a quad-dotted decimal representation. For example, one IP address may be presented as 10.0.0.1. However, as a byte may represent a number as large as $2^8-1$ or $255_{10}$, each byte may represent a range of numbers from 0 to 255 in decimal, such that each IP address may vary from 0.0.0.0 to 255.255.255.255 again in quad-dotted decimal representation or notation.

An IP prefix identifies a subset of addresses with the IP address space and those addresses may be assigned to devices within a particular area within the larger access network. An IP prefix usually identifies a contiguous set of IP addresses within the IP address space. For example, an IP prefix may identify a contiguous set of IP addresses from 10.0.0.1 to 10.0.0.255. This IP prefix may be represented by a routing prefix or 10.0.0.0 followed by a subnet mask identifier (which in this instance may be represented as $24_{10}$ to indicate that the first 24 bits should be 1's within the subnet mask, e.g., 255.255.255.0 in quad-dotted decimal notation), where the prefix and scope identifier may be separated by a slash (/). The IP prefix may therefore be presented as 10.0.0.0/24 suggesting that only the first 24 bits of the 32-bit IP address are necessary to reach the IP subnet (or area) corresponding to the IP prefix. In this instance, the IP prefix may define a routing prefix and may represent a summarized version of the contiguous set of IP addresses.

According to DHCP, each subnet, such as subnet 22, requires either a DHCP server, such as DHCP server 16, or a DHCP relay device, such as DHCP relay device 12, by which to reserve and assign IP addresses to network devices, such as DHCP client devices 20, operating within the respective subnet. As DHCP servers may maintain network resources for a large number of DHCP clients, often, for small subnets, network administrators will utilize one or more DHCP servers or server clusters to service a number of subnets. To do so, the network administrators may maintain one DHCP server, such as DHCP server 16, in a central location and then configure multiple DHCP relay devices, one or more for each subnet, to relay DHCP messages from DHCP clients located within the respective one of the subnets to the single DHCP server or server cluster.

Typically, in these instances, a router or other network device already present within each subnet may provide this DHCP relay service as an optional service that the network administrators may enable in this context. In this respect, DHCP relay device 12 may represent a router or some other similar network device, such as a switch or a hub that provides this DHCP relay service as an optional service. Alternatively, DHCP relay device 12 may represent a dedicated relay device and may comprise any device capable of relaying DHCP messages in the manner described below in more detail. Thus, DHCP relay device 12 may represent any intermediate network device positioned between DHCP client devices 20 and DHCP server 16 that implements DHCP to relay DHCP messages between DHCP clients 20 and DHCP server 16.

While described herein with respect to an intermediary DHCP relay device 12, the techniques may be employed by DHCP server 16 in instances where DHCP client devices 20 reside in the same subnet or network as DHCP server 16. Alternatively, in some instances, DHCP relay device 12 may implement only a portion of the techniques described below. Particularly, when DHCP relay device 12 is in a transparent snooping mode, DHCP relay device 12 may not issue any messages that otherwise alert DHCP client devices 20 and DHCP server 16 to its presence in the network, as it is transparent to client devices 20 and server 16. The techniques are described in more detail below with respect to these alternative network architectures to illustrate other devices and instances in which these techniques may be implemented.

In accordance with the automatic resource release techniques described in this disclosure, a first DHCP client device 20A may, upon attempting to access network 14, first request resources, such as an IP address, required for operating within network system 10. DHCP client device 20A may issue a DHCP discover message 24A in an attempt to discover a DHCP server, such as DHCP server 16, in accordance with DHCP. Typically, DHCP client device 20A may broadcast this DHCP discover message 24A throughout subnet 22.

DHCP discovery message 24A may include a L2 network address (e.g., a hardware address) that is globally unique so as to uniquely identify DHCP client 20A. This hardware address may comprise a Media Access Control (MAC) address assigned to a network interface included within DHCP client 20A. In some instances, DHCP discover message 24A may not use a L2 hardware address but may instead include a client identifier, such as a telephone number associated with DHCP client 20A. This client identifier may be provided as another option field within DHCP messages, where this additional option field is commonly referred to as "option 61." Thus, while described herein with respect to a hardware address, the techniques should not be limited in this way, but may be implemented so as to uniquely identify DHCP clients by way of client identifiers rather than L2 network or hardware addresses. In this respect, both the L2 hardware address and the option 61 defined client identifier may each be considered an identifier that uniquely identifies the client device.

DHCP discovery message 24A may further include a field that defines additional context information that uniquely identifies a context in which DHCP client device 20A operates. For example, DHCP discovery message 24A may include a field referred to as "option 60" that defines a Vendor Class Identifier (VCI). DHCP client device 20A may utilize the option 60 field to identify a vendor of hardware or firmware included within DHCP client device 20A. To specify this additional field, DHCP client device 20A may generate DHCP discovery message 24A to include a field having as an identifier the numeral "60," hence the name "option 60," followed by the VCI.

In this sense, option 60 may identify a vendor of DHCP client device 20A and thereby identify a context in which DHCP client device 20A operates. For example, the VCI specified by option 60 of DHCP discover message 24A may identify a vendor of a set-top box (STB) and thereby identify a cable or digital satellite context in which DHCP client device 20A operates.

Regardless, DHCP relay device 12 may receive the DHCP discover message 24A from a DHCP client device 20A that includes the MAC address of DHCP client device 20A and the additional context information. DHCP relay device 12 may update DHCP discover message 24A to add additional context information before forwarding or otherwise relaying DHCP discover message 24A to DHCP server 16. For example, DHCP relay device 12 may modify DHCP discover message 24A to add an additional field referred to as "option 82." DHCP relay device 12 may update or otherwise modify DHCP discover message 24A with the option 82 field to provide additional information to DHCP server 16. DHCP server 16 may utilize the information provided in the option 82 field when assigning the L3 or IP address to the requesting client.

Much like the above mentioned option 60 field, the option 82 filed may be referred to as "option 82" because this field is denoted by the numeral "82" followed by information concerning the relay of DHCP discover message 24A. This relay information may comprise a client identifier or ID assigned by a network service provider to a subscriber that uses DHCP client device 20A or an interface or circuit ID identifying a physical or logical interface of DHCP relay device 12 on which DHCP relay device 12 received the DHCP discover message 24A. A client ID, which may also be referred to as a remote ID, may comprise, for example, a telephone number. In some instances, the circuit ID comprises a Virtual Local Area Network (VLAN) identifier, tag or other metadata assigned to and associated with a DHCP client device. This VLAN tag may uniquely identify a virtual circuit/interface over which DHCP relay device 16 receives traffic from given DHCP client device residing within a particular context. This VLAN tag may be assigned on a per circuit basis not on a per-device basis and thus both of DHCP client devices 20A, 20B may, for example, be assigned the same VLAN tag identifying the same virtual circuit/interface.

While described below with respect to defining a VLAN tag or other circuit ID, the option 82 may include or define a remote ID in conjunction with the VLAN tag or other circuit ID or only define the remote ID. The techniques however should not be limited to VLAN tags or other circuit IDs and may be implemented with a circuit ID, a remote ID, or both a circuit ID and a remote ID.

Both option 60 and option 82 are extensible or, better stated, may be variably defined to include any type of information. For purposes of discussion, additional context information may include information defined by the option 60 field alone, the option 82 field alone or the combination of both the option 60 and 82 fields. Further details with respect to option 82 are described in RFC3046, entitled "DHCP Relay Agent Information Option," M. Patrick, January 2001, the entire contents of which are incorporated herein by reference.

DHCP relay device 12 may, in addition to updating DHCP discover message 24A with option 82, also parse DHCP discover message 24A to determine both the L2 address and the additional context information encoded to the option 60 field included within DHCP discover message 24A. DHCP relay device 12 may maintain one or more internal tables or other data structures, and search these tables to determine whether DHCP client device 20A was previously assigned an IP address or other network resource. It is assumed for purposes of illustration that DHCP client device 20A is either requesting the network resource for a first time or that a lease for previous network resources has expired, and therefore that DHCP relay device 12 maintains no entry for DHCP client device 20A.

As a result, DHCP relay device 12 may create a new entry within at least one of its internal one or more tables and store within the new entry the MAC address included within DHCP discover message 24A. DHCP relay device 12 may associate the new entry or another entry within another one of the tables with the additional context information. For example, DHCP relay device 12 may associate the new entry with the VCI and interface ID determined from the option 60 and 82 fields, e.g., thereby associating the L2 network address with a vendor context as well as a physical or logical interface of the relay device by which the DHCP discover message was received. After creating these associations, DHCP relay device 12 relays DHCP discover message 24A with the added option 82 field as updated DHCP discover message 26A to DHCP server 16 via links 18 and network 14. DHCP server 16 may respond to updated DHCP discover message 26A with a DHCP offer message 28A that offers a potential lease of network resources including a L3 IP network address. In this sense, while DHCP discover message 26A may appear to attempt to discover one or more DHCP servers, contrary to the name of the message, DHCP discover message 26A may include additional parameters concerning acceptable terms on which DHCP client device 20A will accept a reservation of network resources. These additional parameters may include a length or duration of the lease of the resources, the types of resources to reserve, and the like. In this respect, DHCP discover message 26A may request network resource for reservation and use by a single DHCP client device 20A within network 14. DHCP server 16 may then, based on these parameters, provide an offer for lease of the requested network resource, e.g., IP address, by way of DHCP offer message 28A. DHCP server 16 may copy or replicate both of the option 60 and option 82 fields from updated DHCP discover message 26A and generate DHCP offer message 28A to include both of these option 60 and option 82 fields.

DHCP relay device 12 intercepts the DHCP offer message 28A, removes the option 82 field from DHCP offer message 28A and relays or otherwise forwards this updated DHCP offer message 28 to DHCP client device 20A as updated DHCP offer message 30A. DHCP relay device 12 may utilize this information included within the option 82 field to limit the broadcast or forwarding scope of the updated DHCP offer message 30A. For example, the option 82 field may include circuit or interface information that identifies an interface by which to forward or broadcast updated DHCP offer message 30A. This option 82 field is copied by convention or in accordance with DHCP from the updated DHCP request to the DHCP offer message by DHCP server 16 to facilitate this forwarding by the DHCP relay device.

DHCP client device 20A may receive one or more DHCP offer messages from different DHCP servers similar to DHCP offer message 30A from DHCP server 16. DHCP client device 20A may then select the best one of DHCP offer messages based on the terms of the lease in view of the parameters sent via DHCP discover message 24A. DHCP client device 20A may then issue a DHCP request message 32A to the one of DHCP servers that presented the selected offer requesting the offered lease, which in this instance is assumed to be DHCP server 16 for ease of illustration.

DHCP relay device 12 may forward or otherwise relay DHCP request message 32A to DHCP server 16. DHCP server 16 may then reserve the requested resources, e.g., an offered IP address within the IP address space maintained by DHCP server 16, and responds with a DHCP acknowledge (ACK) message 34A indicating that the requested resources have been reserved for use by DHCP client device 20A within network 14. DHCP relay device 12 may relay or otherwise forward DHCP ACK message 34A to DHCP client device 20A, whereupon DHCP client device 20A, in response to DHCP ACK message 34A, may begin utilizing the reserved resource, e.g., IP address, to access network 14.

Upon receiving either DHCP request message 32A or, more likely, DHCP ACK message 34A, DHCP relay device 12 may parse either of these messages 32A, 34A to determine the network resource DHCP server 16 will or has reserved and updates the one or more tables with the reserved resource. For example, DHCP relay 12 may receive DHCP ACK message 34A indicating that a L3 IP address has been reserved by DHCP server 16 for use by DHCP client device 20A when accessing network 14. DHCP relay device 12 may perform a lookup in the one or more tables using the MAC address included within each and every DHCP message 24-34 to retrieve the entry corresponding to DHCP client device 20A. DHCP relay device 12 may then update the entry to associate the reserved IP address with the MAC address.

DHCP relay device 12 may also update the entry to reflect the length or duration of the lease, as well as, other information pertinent to the lease of the IP address. DHCP relay device 12 may utilize this other lease information for maintenance purposes. For example, DHCP relay device 12 may routinely or periodically traverse the one or more tables to determine whether one or more leases have expired. If a lease has expired or timed-out, DHCP relay device 12 may remove the expired lease entry from the table. DHCP server 16 may also maintain substantially similar tables to that of DHCP relay device 12 and may, like DHCP relay device 12, utilize this information for maintenance purposes. In this respect, DHCP relay device 12 may mirror the lease information stored by DHCP server 16.

In any event, DHCP client device 20A may utilize the reserved IP address when accessing network 14. The dynamic host configuration protocol however does not mandate that leases for IP addresses or any other network resource be released when the reserving device has finished using the network resource. DHCP does not require this release because network devices may suddenly fail or become unconnected from the network and be unable to communicate the release of the reserved network resource. To compensate for this deficiency, DHCP utilizes the above described leases to limit the amount of time a given DHCP client device may reserve a particular network resource, such as an IP address. Thus, even if a device fails to release an IP address, for example, eventually the lease will timeout and the DHCP server that reserved the IP address may automatically release the IP address. DHCP client devices may renew a lease if still using the network resource, but if failed or unable to communicate, the DHCP client device may be unable to communicate this DHCP renew message (which may comprise a DHCP request message that includes options indicating that the DHCP client device requests renewal of the lease for the reserved IP address) and the lease will timeout causing the DHCP server to automatically release the lease.

While providing adequate protection against inefficient use of resources, the Internet has grown and with it the total number of devices that access the Internet and a 32-bit IP address may not be sufficient to uniquely identify each device that desires access to the Internet. In this sense, the IP address space has tightened and even small inefficiencies, such as reserved but not used IP addresses, may limit access to the Internet, such as network 14.

For example, DHCP client device 20A may fail without issuing a DHCP release message, e.g., a DHCP message requesting release of the lease reserving an IP address for use by DHCP client device 20A, to DHCP server 16 releasing the lease of the above IP address. The subscriber utilizing DHCP client device 20A to access network 14 may request a new DHCP client device 20B as a replacement for failed DHCP client device 20A. DHCP client device 20A may in this context be considered a replaced DHCP client device 20A. The subscriber or other user may, upon receiving this DHCP client device 20B, swap DHCP client device 20A for DHCP client device 20B, as shown by the arrow labeled "SWAP" in FIG. 1. DHCP client device 20B is shown in dashed lines to represent later swap of DHCP client device 20B for DHCP client device 20A.

DHCP client device 20B, upon being powered up, activated, or otherwise enabled to operate, may attempt to connect to network 14. In order to communicate with or otherwise access network 14, DHCP client device 20B, similar to DHCP client device 20A, may generate and broadcast a DHCP discover message 24B throughout subnet 22. DHCP client device 20B may generate this DHCP discover message 24B to include both a hardware address assigned to hardware within DHCP client device 20B and an option 60 field that specifies, at least in part, the additional context information. In some examples, the hardware address assigned to hardware within DHCP client device 20B is different from the hardware address assigned to hardware within DHCP client device 20A and included within first DHCP discover message 24A. In this respect, the hardware address of DHCP discover message 24A represents a first hardware address and the hardware address of DHCP discover message 24B represents a second hardware address different from the first hardware address.

DHCP relay device 12 may receive DHCP discover message 24B and update this DHCP discover message 24B to include the option 82 field, e.g., interface ID which in some instances may comprise the above VLAN tag. As DHCP client device 20B replaced DHCP client device 20A, the interface ID or, in some instances, VLAN tag, specified within the option 82 field of the updated version of DHCP discover message 26B may be the same as the interface ID, or VLAN tag, specified within the option 82 field of the updated DHCP discover message 26A, as DHCP client device 20B replaced DHCP client device 20A. Moreover, often the option 60 fields of both DHCP discover messages 24A and 24B specifies the same VCI or may specify different but related VCI's. In any event, DHCP discover message 26B may include a different hardware or MAC address but the same, related, or similar additional context information that identifies the same context in which replaced DHCP client device 20A operated.

DHCP relay device 12 may then perform a lookup on the L2 network address (e.g., MAC hardware address) included within DHCP discover message 24B in the one or more tables to find an entry corresponding to the MAC address. Assuming DHCP client device 20B did not previously operate within subnet 22, DHCP relay device 12 may not locate any entries corresponding to the MAC address of DHCP client device 20B. DHCP relay device 12 may, in response to not finding an entry based on this MAC address, perform a failsafe or additional lookup using the additional context information, e.g., the vendor context from option 60 field as set by the client device as well as the interface context, e.g., the VLAN tag, of option 82 field as may be set by the DHCP relay device. As the additional context information is the same for both the updated version of DHCP discover message 26B, e.g., DHCP discover message 24B updated with the option 82 field, and updated DHCP discover message 26A, DHCP relay device 12 may determine that DHCP client device 20B has replaced DHCP client device 20A, as the MAC addresses are different but the additional context information that identifies the context in which DHCP client devices 20 operate is the same, related or similar.

Assuming that DHCP client device 20A did not fail gracefully, e.g., by issuing a DHCP release message to release the IP address, or that the lease did not expire, DHCP relay device 12 may retrieve an entry based on the additional context information, e.g., the vendor context with respect to the vendor that provided the client device (as specified in option 60 field) in combination with the interface context (as specified in the option 82 field), which for example may comprise the VLAN tag that identifies a logical interface over which DHCP relay device 12 receives traffic from client devices in that particular context. In response to finding this entry, DHCP relay device 12 may then issue a DHCP release message 36 requesting that DHCP server 16 release the IP address originally associated with the additional context as indicated by the entry. DHCP relay device 12 may also remove or release the IP address within its mirrored one or more tables. In this respect, DHCP relay device 12 may release network resources, e.g., a first IP address, reserved for use by DHCP client device 20A within network 14 based on the determination that the additional information within first updated DHCP discover message 26A and the second updated version of DHCP discover message 26B is the same, related or similar. DHCP server 16 may then, in response to DHCP release message 36, release the IP address indicated within DHCP release message 36.

DHCP client device 20B may then, after a short time duration without receiving any response to its first DHCP discover message 24B, broadcast or issue another DHCP discover message 24C in accordance with DHCP. DHCP relay device 12 may be configured not to forward or relay DHCP discover message 24B in order to give DHCP server 16 time to process the previously sent DHCP release message 36 so as to release the IP address indicated by DHCP release message 36, causing DHCP client device 20B to issue another DHCP discover message. DHCP relay device 12 may then receive and update DHCP discover message 24C to include the option 82 field, perform the lookup, and determine that no entry corresponds to either the MAC address or the additional context information, e.g., identified by the option 60 and 82 fields. DHCP relay device 12 may relay this updated version of DHCP discover message 24C to DHCP server 16 as updated DHCP discover message 26B.

Upon receiving updated DHCP discover message 26B, DHCP server 16 may generate a DHCP offer message 28B that offers a potential lease for network resources to DHCP client device 20B. DHCP offer message 28B may include both of the option 60 and 82 fields, which are copied from updated DHCP discover message 26B. DHCP relay device 12 may receive DHCP offer message 28B and remove the option 82 field from DHCP offer message 28B before forwarding this updated DHCP offer message 28B to DHCP client device as updated DHCP offer message 30B. As described above, DHCP client device 20B may receive multiple DHCP offer messages from different DHCP servers and select one of the leases offered by these DHCP servers.

DHCP client device 20B, for purposes of illustration, is assumed to select the lease offered by updated DHCP offer message 30B and issues a DHCP request message 32B to DHCP server 16 requesting the offered lease, which DHCP relay device 12 relays to DHCP server 16. DHCP server 16 may receive DHCP request message 32B and reserve the requested resource, e.g., the offered IP address within the IP address space maintained by DHCP server 16. DHCP server 16, assuming successful reservation of the requested network resource, issues a DHCP ACK message 34B back to DHCP client device 20B, which DHCP relay device 12 relays to DHCP client device 20B. DHCP relay device 12 may also update its one or more mirrored tables to associate the reserved network resource, e.g., IP address, with the hardware address and the additional context information. DHCP client device 20B may then utilize the reserved network resources to access network 14.

In this manner, DHCP relay device 12 may automatically release network resources upon determining that a DHCP client device, such as DHCP client device 20A, did not fail gracefully. In other words, DHCP relay device 12 may automatically, e.g., without any user input or oversight, generate and issue an entire DHCP release message, and not just update a portion of a release message, on behalf of a DHCP client device that did not fail gracefully to release a lease of resources reserved for the failing device. DHCP relay device 12 may, by automatically releasing these network resources, improve re-use of network resources, and thereby improve access to network 14, especially in instances where the address space may be tight or otherwise limited.

While described above as implemented by DHCP relay device 12, DHCP server 12, may, in some instances, implement the techniques. For example, DHCP server 12 may implement the techniques in instances where DHCP relay device 12 does not implement the techniques. In this instance, DHCP relay device 12 may update the messages as described above, but may not store or maintain the additional tables to include the additional context information. However, DHCP server 12 may implement the techniques to store these tables that include the additional context information. This embodiment where DHCP server 12 implements the techniques described herein is describe below in more detail with respect to FIG. 4.

Figure 2:
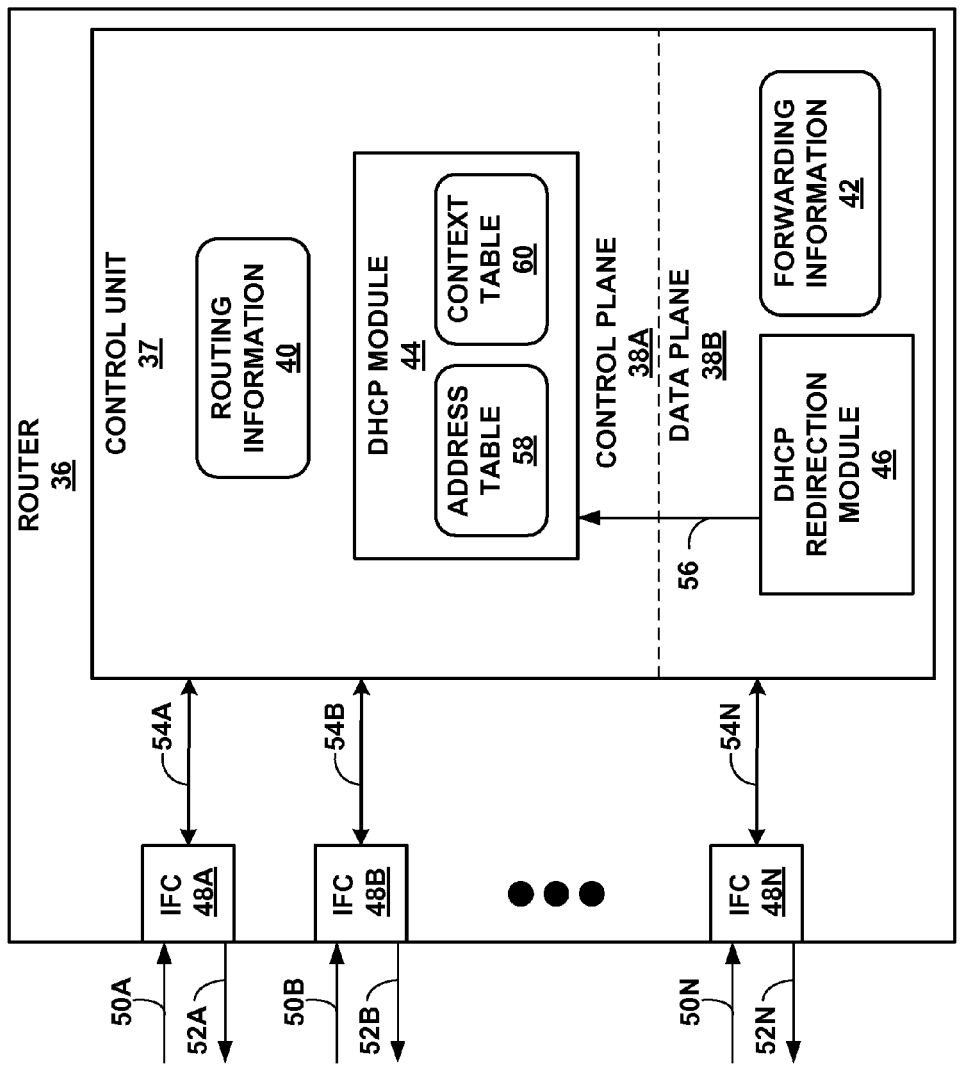
FIG. 2 is a block diagram illustrating an example embodiment of a router that implements the automatic resource release techniques described herein.

FIG. 2 is a block diagram illustrating an example embodiment of a router 36 that implements the automatic resource release techniques described herein. Router 36 may represent any network device that that performs routing functions to route data units through a network. Router 36 may route particular types of data units referred to as packets and as a result may be referred to as a "packet-based router." Moreover, router 36 may implement layer 3 (L3) protocols or network layer protocols (where L3 refers to the L3 of the OSI model, as described above), such as an Internet Protocol (IP), and route packets according to layer 3 information. Consequently, router 36 may also be referred to as a "layer 3 router", a "network layer router" or an "IP router." Moreover, router 36 may represent an example embodiment of DHCP relay device 12 of FIG. 1. For purposes of illustration, router 36 may be described below within the context of exemplary network system 10 of FIG. 1.

As shown in FIG. 2, router 36 includes a control unit 37. Control unit 37 may comprise one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 37 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 37 may be divided into two logical or physical "planes" to include a first control or routing plane 38A and a second data or forwarding plane 38B. That is, control unit 37 may implement two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 38A of control unit 37 may execute the routing functionality of router 36. In this respect, control plane 38A may represent hardware and/or software of control unit 37 that implements routing protocols (not shown in FIG. 2) by which routing information 40 may be determined. Routing information 40 may include information defining a topology of a network, such as network 14. Control plane 38A may resolve the topology defined by routing information 40 to select or determine one or more routes through network 14. Control plane 38A may then update data plane 38B with these routes, where data plane 38B maintains these routes as forwarding information 42. Forwarding or data plane 38B may represent hardware and/or software of control unit 37 that forwards network traffic in accordance with forwarding information 42.

Control plane 38A may further comprise a DHCP module 44 that implements DHCP in the manner described above with respect to DHCP relay device 12 of FIG. 1. In other words, DHCP module 44 may receive DHCP messages, such as DHCP messages 24-34, and relay these messages to a DHCP server, such as DHCP server 16. In some instances, DHCP relay device 12 may update one or more of the received DHCP messages to either add additional context information, e.g., the option 82 field, or remove this additional context information. More information concerning DHCP in general as well as particulars concerning DHCP messages, such as DHCP discover, offer, request, release, renew, acknowledge and other messages can be found in Request for Comments (RFC) 2131, titled "Dynamic Host Configuration Protocol," dated March 1997, herein incorporated by reference in its entirety.

Data plane 38B may also comprise a DHCP redirection module 46. DHCP redirection module 46 may represent a software and/or hardware module that inspects incoming network traffic to determine if this incoming network traffic represents DHCP messages. DHCP redirection module 46 may, in some instances, comprise a logic programmed within a forwarding ASIC or other component of data plane 38B that filters traffic based on headers of the incoming network traffic or any other similar mechanism that data plane 38B may employ to distinguish particular types of network traffic from other types of network traffic.

DHCP redirection module 46 may for example comprise one or more filters programmed within data plane 38B that listens on a one or more ports assigned for DHCP communications, e.g., ports 67 and 68. DHCP redirection module 46 may comprise one filter that listens on these DHCP ports 67 and 68, and upon receiving traffic over these ports, DHCP redirection module 46 may determine an address to which the DHCP communications are transmitted. DHCP clients 20 may, for example, transmit the DHCP messages by broadcasting these DHCP messages over one of the above ports. DHCP redirection module 46 may, therefore, filter packets that indicate a broadcast address, e.g., an address of zero, and designate one of the DHCP ports. DHCP messages from server 16 may specify particular interfaces of router 36 by address and also designate one of the above DHCP ports. DHCP redirection module 46 may likewise filter DHCP messages that include one of the interface addresses and one of the DHCP ports. DHCP redirection module 46 may therefore filter packets in this manner and forward DHCP messages 56 to control unit 37.

As further shown in FIG. 2, router 36 includes Interface Cards (IFCs) 48A-48N ("IFCs 48") that receive and send packet flows or network traffic via inbound network links 50A-50N ("inbound network links 50") and outbound network links 52A-52N ("outbound network links 52"), respectively. IFCs 48 are typically coupled to network links 50, 52 via a number of interface ports (not shown), and forward and receive packets and control information from control unit 37 via a respective one of paths 54A-54N ("paths 54"). Each physical interface of IFCs 48 is typically assigned a unique identifier by control unit 37, and multiple logical interfaces having unique identifiers may be assigned to each physical interface, where each logical interface represents as a distinct input or output interface for different network traffic. These logical interfaces may represent VLANs and each VLAN may be assigned a unique VLAN tag. Often, each particular context in which a DHCP client devices resides is assigned a VLAN tag to differentiate between client devices of different context. Each of IFCs 48 may also each couple to a different separate sub-network via links 50, 52. These sub-networks, although not shown in FIGS. 1 and 2, may comprise a Large Area Network (LAN) or other broadcast network.

Router 36 may include a chassis (not shown in FIG. 2) having a number of slots for receiving a set of cards, including IFCs 48. Each card may be inserted into a corresponding slot of a chassis for communicably coupling the card to a control unit 36 via a bus, backplane, or other electrical communication mechanism.

Initially, router 36 may receive network traffic via inbound network links 50 from a DHCP client device, such as DHCP client device 20A. In particular, IFCs 48 coupled to respective inbound network links 76 may receive the network traffic, whereby each of IFCs 48 forward the network traffic to data plane 38B. DHCP redirection module 46 may then filter or otherwise perform operations to determine whether the incoming network traffic includes DHCP messages, such as DHCP messages 24-34. DHCP redirection module 46 may inspect the incoming network traffic and identify DHCP messages based on the format of DHCP messages, as set out in detail in the above incorporated RFC 2131. DHCP redirection module 46, upon detecting one or more DHCP message within the incoming network traffic, may forward either the DHCP message or a copy of the DHCP message to DHCP module 44, which is shown in FIG. 2 as DHCP messages 56.

As described above with respect to FIG. 1, router 36 may first receive a DHCP discover message, such as DHCP discover message 24A, that includes the option 60 field from a first DHCP client device 20A, where the DHCP discover message is received over a particular physical interface and optionally over a logical interface associated with the physical interface. DHCP redirection module 46 may detect or filter this message 24A and forward message 24A to DHCP module 44 as one of DHCP messages 56. DHCP redirection module 46 may not forward a copy or replica of this message 24A, as DHCP module 44 may update message 24A with the option 82 field. In this respect, for messages 56 to which DHCP module 44 adds additional information or updates, DHCP redirection module 46 may forward the actual message and not a replica or copy of the message. In some instances, DHCP redirection module 46 may forward metadata, e.g., in the form of a tag appended to the message, indicating an interface ID that identifies the logical and/or physical interface of one of IFCs 48 over which the message was received.

In any event, DHCP module 44 may update message 24A with the option 82 field so as to carry additional context information in the form of circuit context data. For example, DHCP module 44 may update option 82 field to include circuit context data to encode relay agent local identification of the circuit (e.g. physical or logical interface number or VLAN identifier) on which the DHCP packet was received. Further, option 82 field may already contain additional information specified by the particular client device with respect to the circuit, such as data encoding the remote host end of the circuit (e.g. a caller ID telephone number or a modem ID of a cable modem). The collective data stored in option 82 field after updating by DHCP module 44 of the relay agent (router 36 in this example), including the relay agent local identification of the circuit, is referred to herein as the circuit context information. In instances where metadata is appended to message 24A, DHCP module 44 may insert the information, e.g., interface ID or relay information, specified by the tag or metadata into the updated option 82 field. In some cases, DHCP module 44 may determine the information to be stored to the option 82 field based at least in part on routing information 40 and a L2 address or other information parsed form DHCP messages 56.

DHCP module 44 may next parse DHCP discover message 24A to determine a hardware address included within message 24A. DHCP module 44 may include and maintain an address table 58 that includes address entries that map L2 hardware addresses to L3 IP addresses or other network resources. DHCP module 44 may use the parsed hardware address from message 24A to perform a lookup in address table 58 for an address entry associated with the parsed hardware address.

Assuming no entry exists in address table 58 that is associated with the parsed hardware address, DHCP module 44 may parse the additional context information specified in either or both of the option 60 and 82 fields. DHCP module 44 may further include and maintain a context table 60 that includes one or more context entries, each of which associates context information with an IP address or other network resources. That is, the entries of the context table 60 can be indexed by vendor context in combination with circuit context so as to retrieve an associated L3 IP address. While shown as separate tables 58 and 60 in FIG. 2, DHCP module 44 may maintain these tables within a single table data structure having two indexes with a first index associating hardware addresses to entries and a second index associating context information (e.g., vendor context in combination with circuit context) to entries. In this way, both of tables 58, 60 may reside within a single table having entries that each store a different L2 hardware address, context information and L3 IP addresses.

Regardless of the structure of tables 58 and 60, when no entry exists for the hardware address, DHCP module 44 may perform a second lookup using the context information parsed from message 24A as a key. Assuming no entry exists in either of tables 58 and 60, DHCP module 44 may create an entry in each of tables 58 and 60, with the new entry of table 58 specifying the parsed hardware address and the new entry of table 60 specifying the parsed context information (e.g., the combination of vendor context and the circuit context or a hash of a combination thereof). DHCP module 44 may then forward message 24A back to data plane 38B, which proceeds to forward message 24A in accordance with forwarding information 42 as updated DHCP discover message 26A. Particularly, data plane 38B may forward updated DHCP discover message 26A via a one of IFCs 48 indicated in forwarding information 42.

After forwarding updated DHCP discover message 26A, DHCP redirection module 46 may detect a DHCP offer message 28A when filtering incoming network traffic arriving via inbound network links 50. DHCP redirection module 46 may forward this message to DHCP module 44 as DHCP messages 56, whereupon DHCP module 44 may remove the option 82 field and forward the message back to data plane 38B. Data plane 38B may then forward this message as updated DHCP offer message 30A back to DHCP client device 20A via one of the logical and/or physical interfaces associated with IFCs 48 as indicated by forwarding information 42.

DHCP redirection module 46 may, after forwarding updated DHCP offer message 30A, detect a DHCP request message 32A and forward this message up to DHCP module 44 so that additional context information, e.g., by way of the option 82 field, can be added to this message. Thus, while not shown in FIG. 1 as including updated offer message and updated DHCP ACK messages, DHCP module 44 may update this message to add and remove the additional context information from these messages. These additional messages are not shown in FIG. 1 for ease of illustration purposes. DHCP module 44 may also, in some instances, update address table 58 and context table 60 with the requested IP address, as described in more detail below. DHCP module 44 may then forward message 30A back to data plane 38B, which may forward this message 32A in the manner described above.

DHCP redirection module 46, after data plane 38B forwarded DHCP request message 32A, detect a DHCP ACK message 34A within incoming network traffic. DHCP redirection module 46 may, in some instances, forward DHCP ACK message 34A to DHCP module 44 so that DHCP module 44 may update address table 58 and context table 60 with the IP address reserved for use within network 14 by DHCP client device 20A. DHCP module 44 may parse the hardware address from DHCP ACK message 34A and perform a lookup of address table 58 using the parsed hardware address to retrieve the entry previously associated with the hardware address. DHCP module 44 may then update the associated entry with the reserved network resource, e.g., IP address.

DHCP module 44 may likewise parse additional context information from DHCP ACK message 34A and perform a lookup to retrieve an entry associated with the parsed context information within context table 60. DHCP module 44 may then update this entry with the reserved network resources, e.g., IP address. Alternatively, DHCP module 44 in the single table instance may only perform the lookup once based on the parsed hardware address and update the single entry. After updating tables 58 and 60, DHCP module 44 may forward DHCP ACK message 34A back to data plane 38B, which forwards message 34A in the manner described above.

Assuming for purposes of illustration that DHCP client device 20A fails without releasing the above reserved IP address (or, in other words, does not fail gracefully) and is replaced by DHCP client device 20B, DHCP module 44 may receive a DHCP discover message 24B from DHCP client device 20B. DHCP redirection module 46 may intercept this message 24B and forward this message 24B to DHCP module 44 as one of DHCP messages 56. DHCP module 44 may update this message 24B with the above described option 82 field to generate an updated DHCP discover message 26B. Updated DHCP discover message 26B may include both an option 60 field specifying a VCI and an option 82 field specifying circuit context information as installed by router 36 (e.g., interface context for the discover message) and optionally any data installed by the DHCP client at the remote host-end of the circuit. In this respect, DHCP discover message 26B may define additional context information that identifies the same context as that identified by DHCP discover message 24B received from now replaced DHCP client device 20A. For example, router 36 will likely receive both DHCP messages 24B, 26B over the same circuit (e.g., VLAN or logical/physical interface), any information installed by the remove client (e.g., caller ID telephone number) as well as vendor context information (e.g., data identifying the vendor) will likely be the same.

DHCP module 44 may parse either DHCP discover message 24B or updated DHCP discover message 26B to determine a hardware address, e.g., MAC address, specified by one of these messages. Based on the parsed hardware address, DHCP module 44 may perform a lookup of address table 58 to retrieve an entry associated with the parsed hardware address. DHCP module 44, considering that DHCP client device 20B has not previously accessed network 14 or reserved any network resources, may not retrieve an entry from address table 58. DHCP module 44 may, as a result, create a new entry within address table 58 and associate the new entry with the parsed hardware address.

DHCP module 44 may, upon failing to retrieve an entry associated with the parsed hardware address within address table 58, parse updated DHCP discover message 26B to determine the additional context information, e.g., the information stored to the option 60 and 82 fields. Based on the parsed additional context information, DHCP module 44 may perform a lookup of context table 60 to retrieve a context entry. Considering that the additional context information of DHCP discover message 24B is the same as the additional context information of DHCP discover message 24A, DHCP module 44 may retrieve a context entry associated with the parsed additional context information.

In response to this context entry, DHCP module 44 may determine that DHCP client device 20A has failed without releasing the IP address reserved for DHCP client device 20A. DHCP module 44 may, as a result of this determination, automatically, e.g., without user or administrator intervention, generate a DHCP release message 36 on behalf of client device 20A. DHCP release message 36 may request or otherwise cause DHCP server 16 to release the IP address reserved for use by DHCP client device 20A. DHCP module 44 may forward this message 36 to data plane 38B, which proceeds to forward DHCP release message 36 in the manner described above to DHCP server 16.

DHCP module 44 may then update address table 58 so as to remove the address entry corresponding to the released IP address from address table 58. In this respect DHCP module 44 may automatically release, on behalf of a DHCP client device that did not fail gracefully, an IP address or other network resource reserved for use by the failed DHCP client device. By performing this automatic resource release, DHCP module 44 may improve network performance and otherwise promote efficient network operation.

DHCP module 44 may also not update and forward DHCP discover message 24B from DHCP client device 20B in order to provide DHCP server 16 with sufficient time to release the IP address and/or other network resources reserved for use by DHCP client device 20A. DHCP module 44, again by way of DHCP redirection module 46, receive another DHCP discover message 24C in accordance with DHCP from replacement DHCP client device 20B. DHCP module 44 may update DHCP discover message 24C with the option 82 field and forward this message back to data plane 38B, which may forward updated DHCP discover message 26B in the manner described above. DHCP module 44 may proceed to receive a DHCP offer message 28B, update this message by removing the option 82 field, and forward updated DHCP offer message 30B. DHCP module 44 may receive, after forwarding updated DHCP offer message 30B, a DHCP request message 32B and update and forward this message 32B. In some instances, DHCP module 44 may, after forwarding DHCP request message 32B, update address table 58 and context table 60, as described above, to associate address and context entries with the requested IP address.

After forwarding DHCP request message 32B, DHCP module 44 may receive a DHCP ACK message 34B acknowledging the reservation of the IP address for use by DHCP discover message 20B. DHCP module 44 may, in some instances, update an address entry and context entry within respective tables 58, 60 to reflect the reservation of the IP address by server 16. In this manner, DHCP module 44 may maintain tables 58 and 60 to mirror similar tables maintained by server 16. DHCP module 44 may continue to implement the automatic resource release techniques to correct any inefficiencies resulting from the graceless failure of DHCP client devices, such as DHCP client device 20A.

Figure 3:
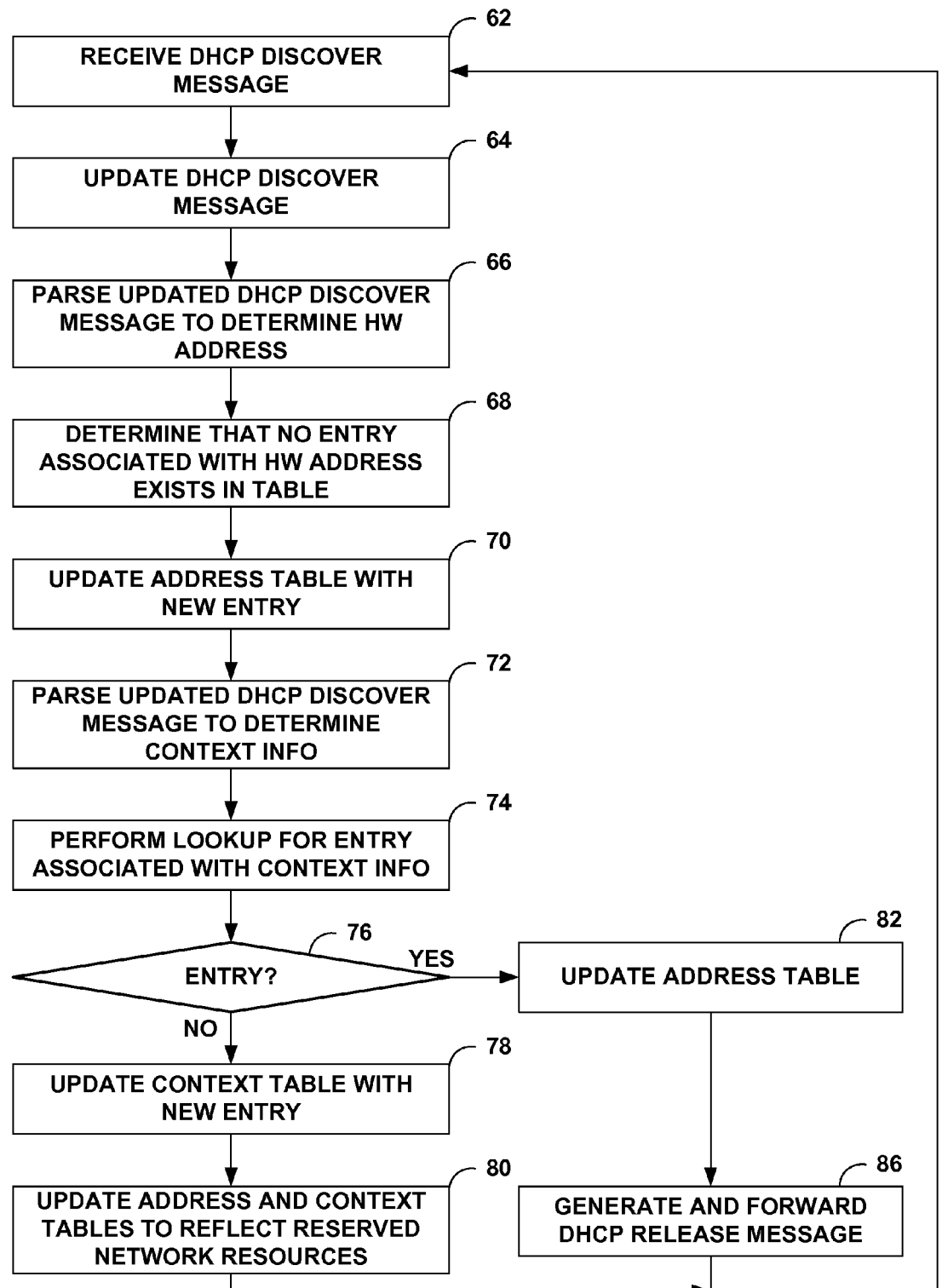
FIG. 3 is a flowchart illustrating exemplary operation of a network device in performing the techniques of the invention.

FIG. 3 is a flowchart illustrating exemplary operation of a network device, such as router 36 of FIG. 2, in performing the techniques of the invention. While described with respect to a particular network device, e.g., router 36, the techniques may be implemented by any network device capable of relaying, either transparently or otherwise, messages related to reservation of network resources or actual reservation of network resources, as described below in more detail.

Initially, router 36 receives a DHCP discover message, such as DHCP discover message 24A shown in FIG. 1 (62). DHCP redirection module 46 may intercept DHCP discover message 24A by filtering incoming network traffic received via inbound network links 50 and respective IFCs 48. DHCP redirection module 46 may forward intercepted DHCP discover message 24A as one of DHCP messages 56 to DHCP module 44. DHCP module 44 may update DHCP discover message 24A in the manner described above to generate updated DHCP discover message 26A (64). DHCP module 44 may parse updated DHCP discover message 26A (or DHCP discover message 24A) to determine a hardware (HW) address, such as a MAC address assigned to hardware included within DHCP client device 20A (66).

Using this parsed HW address as a key into address table 58, DHCP module 44 may perform a lookup to determine that none of the addresses entries of address table 58 correspond to the parsed hardware address (68). No entries correspond to the parsed hardware address because it is assumed for purposes of illustration that DHCP client device 20A has not previously operated within network system 10 or that a prior lease of network resources has expired. If DHCP client device 20A had previously request a network resource, DHCP client device 20A upon restarting or otherwise rebooting may issue a DHCP request message requesting the IP address again.

Continuing under the assumption that DHCP client device 20A has no ongoing reservation of a network resource, DHCP module 44 may update address table 58 to create a new entry within address table 58 and associate this new entry with the parsed hardware address (70). DHCP module 44 may then parse updated DHCP discover message 26A to determine the above described additional context information identifying a context in which DHCP client device 20A operates (72). DHCP module 44 may use the parsed additional context information as a key when performing a lookup on context table 60 to determine whether any of the entries of context table 60 correspond to the parsed context information (74). If no entry is found ("NO" 76), DHCP module 44 may update context table 60 with a new entry and associate this new entry with the parsed context information (78).

DHCP module 44 may then forward updated DHCP discover message 26A to data plane 38B, which proceeds to forward updated DHCP discover message 26A in the manner described above. DHCP module 44 may then, as described above, successively receive a DHCP offer message 28A, a DHCP request message 32A and a DHCP ACK message 34A, each of which are sent to reserve an IP address and/or other network resources for use by DHCP client device 20A. In response to one or more of the above messages 28A-34A, DHCP module 44 may update address and context tables 58, 60 to reflect the reservation of an IP address and/or other network resources for use by DHCP client device 20A (80). DHCP module 44 may update these tables 58 and 60 in the manner described above to associate one or more entries of these tables with the reserved IP address and/or other network resources.

As described above, it is assumed for purposes of illustration that DHCP client device 20A fails without releasing the reserved IP address and/or other network and is replaced or swapped for DHCP client device 20B. DHCP client device 20B may then issue a DHCP discover message 24B, which DHCP module 44 receives in the manner described above (62). DHCP module 44 may update DHCP discover message 24B with the option 82 field and parse this updated DHCP discover message to determine the hardware (HW) address included within the updated DHCP discover message (64, 66). DHCP module 44 may perform a lookup using the parsed hardware address only to determine that no entry associated with the parsed hardware address exists in address table 58 for the above described reasons (68). DHCP module 44 may update address table 58 with a new entry and associate the new entry with the parsed hardware address (70).

However, rather than immediately relay updated this DHCP discover message upon failing to find such an entry, DHCP module 44 may parse this updated DHCP discover message to determine the additional context information (72). In some examples, as DHCP client device 20B has replaced DHCP client device 20A, DHCP client device 20B operates in the same context as that in which DHCP client device 20A operated. In this respect, the additional context information parsed from this updated DHCP discover message received from DHCP client device 20B is the same, similar or at least related enough to the additional context information of updated DHCP discover message 26A so as to enable DHCP module 44 to determine that DHCP client device 20A failed without releasing the IP address reserved for use by DHCP client device 20A.

To illustrate, DHCP module 44 may perform a lookup for a context entry of context table 60 that is associated with the parsed context information (74). Considering that this information may be the same as the context information included within updated DHCP discover message 24A, DHCP module 44 may retrieve the entry previously created in response to DHCP discover message 24A and associated with the context information parsed from DHCP discover message 24A ("YES" 76). Upon retrieving this entry, DHCP module 44 may determine that DHCP client device 20A did not fail gracefully and that an IP address may still be reserved by DHCP server 16 for use by DHCP client device 20A.

DHCP module 44 may, in some instances, verify that the lease reserving the IP address for use by DHCP client device 20A has not expired by accessing address table 58 using the reserved IP address. If not active, DHCP module 44 may forward the updated DHCP discover message similar to updated DHCP discover message 26A, whereby DHCP client 20B, router 36 and DHCP server 16 may proceed similar to that discussed above with respect to reserving an IP address for DHCP client device 20A.

However, for purposes of illustration, it is assumed the lease still exists, and DHCP module 44 may update address table 86 in the manner described above to remove the entry associated with the released IP address (82). DHCP module 44 may then generate and forward a DHCP release message 36, as described above (86). In this way, router 36 may act on behalf of a client device that failed without gracefully releasing network resources reserved for use by the failed client to gracefully release the network resources reserved for use by non-operational client devices.

Figure 4:
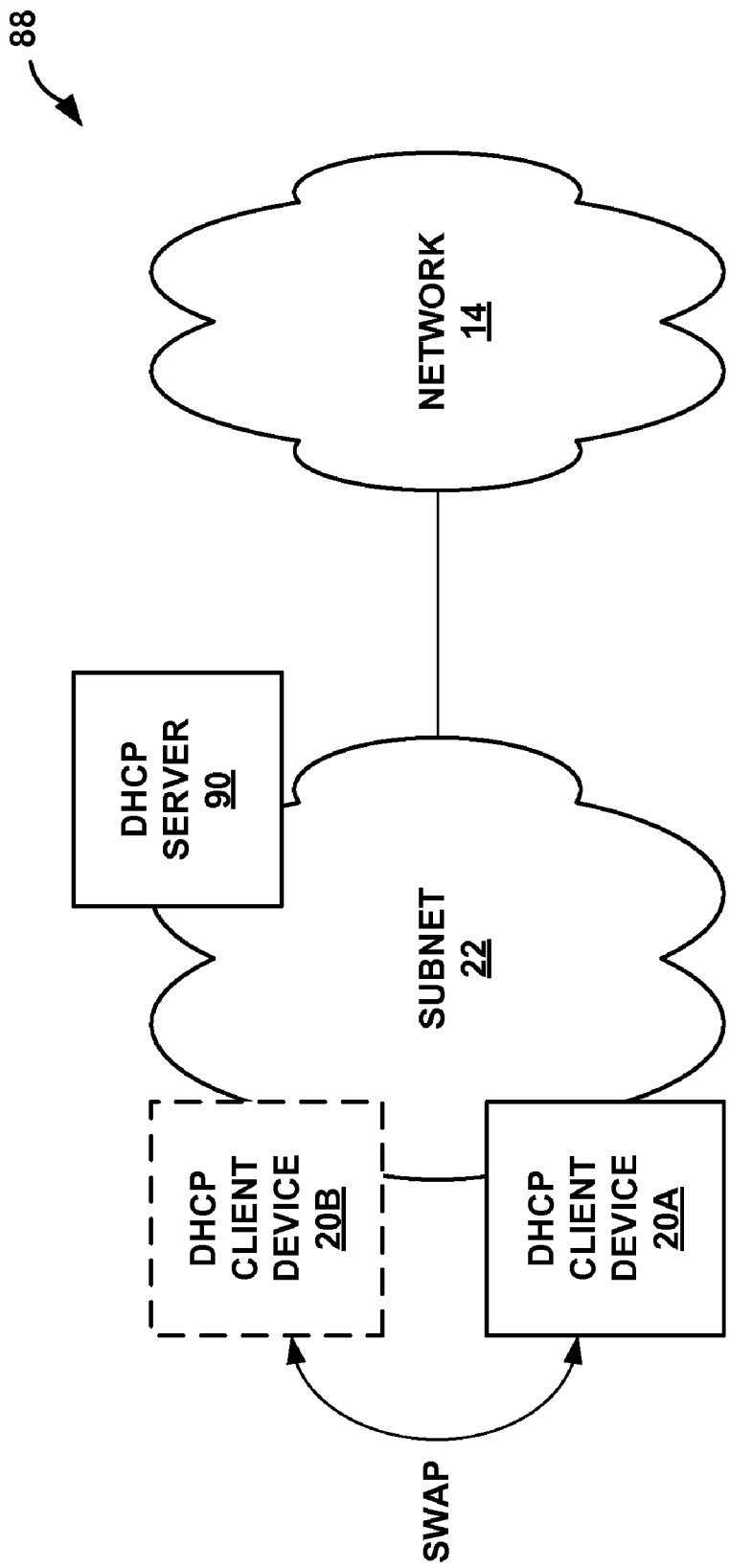
FIG. 4 is a block diagram illustrating another exemplary network system in which a DHCP server implements the techniques described herein to automatically release network resources.

FIG. 4 is a block diagram illustrating another exemplary network system 88 in which a DHCP server 90 implements the techniques described herein to automatically release network resources. Network system 88 may be similar to network system 10 of FIG. 1 in that both of systems 10 and 88 include a network 14, DHCP client devices 20A, 20B and a subnet 22. However, network system 88 does not include a DHCP relay device 12, as DHCP server 90 in the example of FIG. 4 resides in the same subnet, e.g., subnet 22, as DHCP client devices 20. DHCP server 90 may be substantially similar to DHCP server 16 of FIG. 1, except that DHCP server 90 may implement the techniques described herein.

While assumed for purposes of example not to include a DHCP relay device, this is not a precondition or requirement for DHCP server 90 to implement the techniques described herein. As described above, DHCP server 90 may implement the techniques in instances where a DHCP relay device 12 is positioned between the DHCP client and DHCP server 90. For example, DHCP relay device 12 may not implement the techniques described herein and, in these instances, DHCP server 90 may implement the techniques, as described in more detail below, to automatically release resources associated with a given DHCP client device. The techniques therefore should not be limited to the exemplary embodiments described herein.

As described above, DHCP requires that either a DHCP server or a DHCP relay device reside in the same subnet as the DHCP clients. As shown in FIG. 4, subnet 22 includes DHCP server 90 and thus need not include a DHCP relay device, such as DHCP relay device 12. In this respect, DHCP client device 20A may issue a DHCP discover message, such as DHCP discover message 24A, directly, e.g., without a DHCP relay device intercepting and relaying the message, to DHCP server 16. DHCP client device 20A may generate and transmit DHCP discover message 24A with the additional context information stored to the option 60 field, as described above. In some instances, DHCP client device 20A may directly generate updated DHCP discover message 26A or in other words generate a DHCP discover message to include the additional context information stored to both the option 60 and option 82 fields.

In still other instances, DHCP client device 20A may generate DHCP discover message 24A with the additional context information stored to the option 60 field and forward DHCP discover message 24A to DHCP server 16. An intermediate network device, such as a Digital Subscriber Line Access Multiplexor (DSLAM) providing network access, may, when forwarding DHCP discover message 24A, update DHCP discover message 24A to add additional context information, often in the form of an option 82 field including additional circuit context data specific to the circuit by which the DSLAM received the request. This DSLAM or other intermediate network device may not be considered a DHCP relay device, as the DSLAM may not route or otherwise direct the DHCP messages to particular DHCP servers, but instead merely update particular messages to facilitate service of DHCP messages.

Regardless, DHCP server 90 may receive a DHCP discover message from DHCP client device 20A that includes additional context information stored to an option 60 field, an option 82 field or a combination thereof. DHCP server 90 may respond with a DHCP offer message offering a lease of an IP address and/or other network resources. DHCP client device 20A may, in response to the DHCP offer message, issue a DHCP request message in order to reserve the offered lease of the IP address. DHCP server 90, as described above, may respond to the DHCP request message with a DHCP ACK message that acknowledges the request for the lease.

DHCP server 90, similar to DHCP relay device 12, may maintain one or more tables in which to record the lease for the IP address. As described above, DHCP relay device 12 maintained these one or more tables to mirror one or more tables maintained by DHCP server 90. Thus, DHCP server 90 may maintain similar tables to associate a hardware address associated with DHCP client device 20A with the IP address reserved for use by DHCP client device 20A, as described above. With respect to FIG. 1, DHCP server 16 may maintain only an address table as the additional context information need not be maintained by DHCP server 16 considering that it did not implement the automatic resource release techniques. With respect to FIG. 4, however, DHCP server 90 may maintain the one or more tables to associate the additional context information with the IP address reserved for use by DHCP client device 20A. As a result, DHCP server 90 may include both an address table, such as address table 58 of FIG. 2, and a context table, such as context table 60, or as described above a single table that combines both of address and context tables 58 and 60.

Upon the graceless failure of DHCP client device 20A and subsequent replacement of DHCP client device 20A with DHCP client device 20B, DHCP server 90 may receive yet another DHCP discover message from DHCP client device 20B. This second DHCP discover message may include a different hardware address than the first DHCP discover message from DHCP client device 20A but the same, similar or related additional context information. DHCP server 90 may parse this second DHCP discover message to determine the hardware address and perform the above described lookup to determine whether one of the address entries of address table 58 is associated with the parsed hardware address. Upon finding no corresponding address entry, DHCP server 90 may parse the second DHCP discover message to determine the additional context information and perform the above described lookup to determine whether one of the context entries of context table 60 is associated with the parsed context information.

Upon retrieving the entry previously associated with the context information parsed from the first DHCP discover device, DHCP server 90 may automatically release the IP address associated with the parsed additional context information, as DHCP server 90 may determine that DHCP client device 20A has failed gracelessly and been replaced by DHCP client device 20B. DHCP server 90 may then respond to the second DHCP discover message with a DHCP offer message contrary to DHCP server 16 of FIG. 1, which responded with a DHCP ACK message acknowledging the release of the IP address reserved for use by DHCP client device 20A. DHCP server 90 need not in this instance issue the DHCP ACK message, as it has previously determined that DHCP client device 20A is non-operational and thus will not receive any DHCP ACK message. Moreover, as a result of the lack of a DHCP relay device, DHCP server 90 may immediately respond with a DHCP offer message rather than requiring DHCP client device 20B to sent a third DHCP discover message. In this respect, communications between DHCP client device 20B and DHCP server 90 may proceed more efficiently as a result of the proximity of DHCP server 90 to DHCP client device 20B.

DHCP client device 20B and DHCP server 90 may then continue, much as DHCP client device 20A and DHCP server 90 proceeded, to reserve an IP address for use by DHCP client device 20B. Upon reserving or leasing the IP address, DHCP client device 20B may access network 14 using the reserved IP address. In this way, a server or other network device that is not an intermediate network device may implement the automatic resource release techniques to improve the efficiency with which network resources, e.g., IP addresses, are used and re-used within a network system 88.

Figure 5:
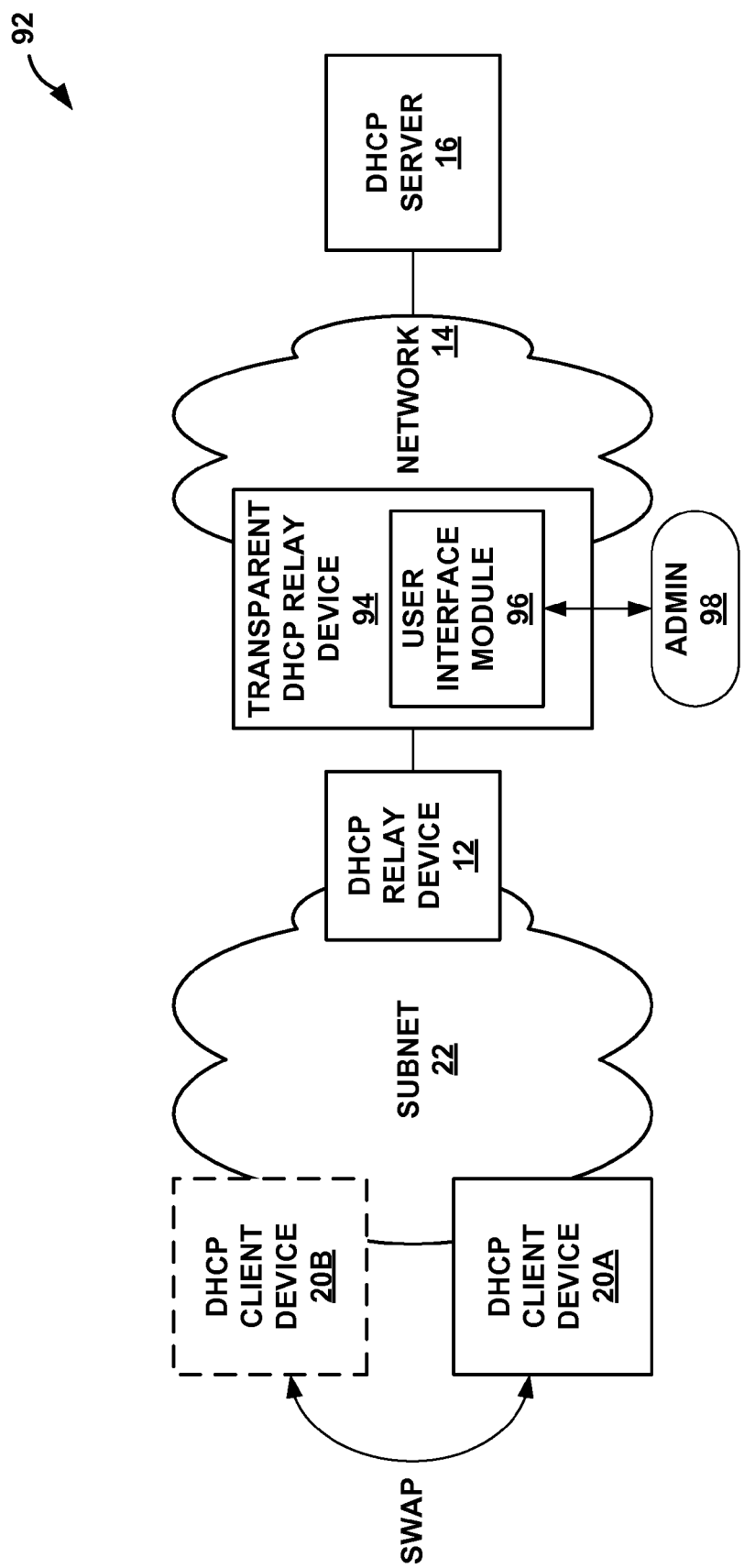
FIG. 5 is a block diagram illustrating yet another exemplary network system in which a transparent DHCP relay device implements the techniques described herein to automatically release network resources.

FIG. 5 is a block diagram illustrating another exemplary network system 92 in which a DHCP relay device 94 transparently implements the techniques described herein to automatically release network resources. Network system 92 may be similar to network system 10 of FIG. 1 in that both of systems 10 and 92 include a network 14, a DHCP relay device 12, a DHCP server 16, DHCP client devices 20A, 20B and a subnet 22. However, network system 92 further includes a transparent DHCP relay device 94 that transparently relays DHCP messages from at least one subnet, e.g., subnet 22, to DHCP server 16. DHCP relay device 94 may be "transparent" in that none of DHCP relay device 12, DHCP server 16 and DHCP client devices 20 may be aware of the presence of transparent DHCP relay device 94 within network system 92.

Transparent DHCP relay device 94 may be employed in network 14 to implement the automatic resource release techniques, as DHCP relay device 12 may not support this optional technique. Transparent DHCP relay device 94 may also be referred to as a "snooping" relay device 94 in that transparent DHCP relay device 94 may "snoop" the above described DHCP communications unicast from DHCP relay device 12 to DHCP server 16. To "snoop" these DHCP communications, transparent DHCP relay device 94 may transparently inspect, e.g., without any other device being aware of the inspection, each packet that it receives and determine whether each of these packets correspond to the DHCP protocol.

In addition to snooping these communications, DHCP relay device 94 may provide or otherwise create an access route from DHCP client device 20 to network 14 in order to facilitate delivery of these unicast DHCP communications. In other words, DHCP relay device 94 may be employed in network 14 to allow access to network 14. Often, transparent DHCP relay device 94 may implement the techniques described herein to provide additional functionality over its original purpose of creating and maintaining the access route.

Transparent DHCP relay device 94 may be substantially similar to DHCP relay device 12, as described above, in that transparent DHCP relay device 94 may include and maintain the one or more tables, e.g., tables 58 and 60, in order to associate not only hardware address, but also context information, with reserved IP addresses. In some instances, DHCP relay device 94 may include a DHCP redirection module similar to redirection module 46 shown in FIG. 2, however the DHCP redirection module of device 94 may filter traffic in a slight different manner than that of DHCP redirection module 46. Rather than filter broadcast traffic, the DHCP redirection module of device 94 may only filter unicast traffic because DHCP relay device 12 may convert the broadcast traffic from DHCP client devices 20 into unicast traffic and forward the unicast traffic through DHCP relay device 94. The redirection module of DHCP relay device 94 may therefore be modified to filter only on unicast traffic and, more particular, filter traffic based on the DHCP ports discussed above without, in some instances, filtering on a combination of DHCP ports and broadcast or even unicast addresses.

Moreover, transparent DHCP relay device 94, as a result of its transparent nature, may not, in some instances, generate a DHCP release message, e.g., a DHCP message that requests release of a reserved IP address, or otherwise add or update DHCP messages. Instead, transparent DHCP relay device 94 may merely maintain the tables so as to inform or otherwise alert a network administrator of inefficient use of network resources.

For example, transparent DHCP relay device 94 may include a user interface module 96 with which a user, such as administrator 98 ("admin 98"), may interact to view these alerts, warnings or other error messages. Transparent DHCP relay device 94 may include, similar to control unit 37 shown with respect to router 36 of FIG. 2, a control unit that executes user interface module 96. Typically, user interface module 96 executes within the control plane of the control unit, such as control plane 38A, and is communicatively coupled to a DHCP module, such as DHCP module 44. The DHCP module may, upon detecting that a DHCP client device, such as DHCP client device 20A, has failed gracelessly and been replaced by another DHCP client device, such as DHCP client device 20B, in accordance with the techniques, as described above, communicate this inefficiency to user interface module 96. User interface module 96 may then generate a user interface or update a currently presented user interface and present this user interface or updated user interface to alert admin 98 of the inefficient use of an IP address.

The user interface may provide information that identifies failed DHCP client device 20A, such as the hardware address associated with DHCP client device 20A, subnet 22, the IP address reserved for the failed DHCP client device, the additional context information associated with the IP address reserved for the failed DHCP client device and any other information that may facilitate understanding of the inefficient use of the IP address, e.g., error codes, and otherwise enable admin 98 to correct the inefficiency. Admin 98 may then, based on this presented information, access DHCP server 16 to correct the inefficiency by, for example, manually releasing the IP address reserved for use by failed DHCP client device 20A. While described with respect to transparent DHCP relay device 94, other network devices, such as DHCP relay device 12 of FIG. 1 or router 36 of FIG. 2, may include a user interface module similar to user interface module 96 by which an administrator may interact to view, log, or otherwise determine or preserve errors related to inefficient use of network resources by client devices 20.

In some instances, transparent DHCP relay device 94 may act transparently on behalf of failed DHCP client device 20A by issuing a DHCP release message to mimic graceful failure of DHCP client device 20A. In other words, DHCP relay device 94 may generate a message acting as DHCP client device 20A to preserve its transparent nature, much as DHCP relay device 12 in the example of FIG. 1 generates DHCP release message 34 on behalf of DHCP client device 20A. In this respect, DHCP relay devices 12 and 94 may act as proxies for DHCP client devices 20 and therefore may be referred to as "DHCP proxy devices." While in some instances this may violate the transparent nature of these devices, such as in the case of transparent DHCP relay device 94, by acting as a proxy, transparency may still be mostly maintained. Considering the extent of inefficiencies, an administrator, such as admin 98 may decide to implement the techniques at transparent DHCP relay device 94 such that transparent DHCP relay device 94 actively generates DHCP release messages to cure the inefficiencies even if such actions arguably violate the transparent nature of that device.

While described herein with respect to a DCHP relay device that receives a DHCP request, updates that request with an Option 82 field, and forward the updated DHCP request to the DHCP server, the techniques may also be implemented by merely storing the information stored within the Option 82 field rather than updating the DHCP request with the Option 82 field and forwarding the updated DHCP request. In these instances, a network device may, in accordance with the techniques, receive the DHCP request specifying the vendor information via an Option 60 field and determine a L2 circuit by which the network message was received. The network device may then access a data structure, such as a table, within the intermediate network device to identify a IP address that is currently assigned for use within the network and associated with the same vendor context information specified in the Option 60 field of the DHCP request and the same L2 circuit by which the intermediate network device received the network message. The network device may then generate and output a message requesting that the DHCP server release the second IP address. In this respect, the techniques may be implemented without updating the DHCP request or any other DHCP communication to include the Option 82 field.

Figure 6:
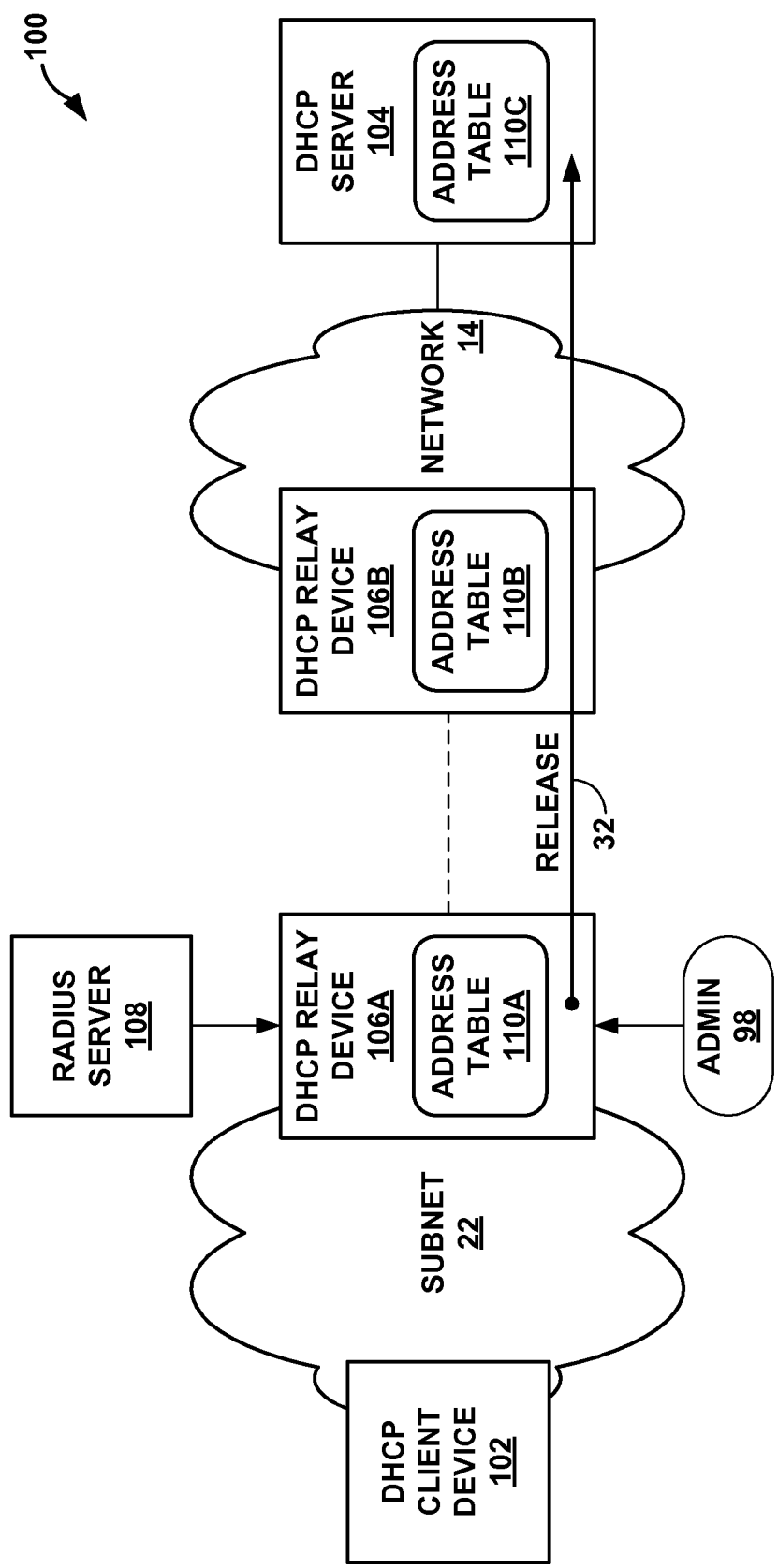
FIG. 6 is a block diagram illustrating an exemplary network system that implements the automatic binding synchronization techniques described in this disclosure.

FIG. 6 is a block diagram illustrating an exemplary network system 100 that implements the automatic binding synchronization techniques described in this disclosure. As shown in the example of FIG. 6, network system 100 includes a subnet 22 and a network 14, which may be substantially similar to those included within network systems 10, 88 and 92 shown in the examples of FIGS. 1, 4 and 5, respectively. Subnet 22 of the example of FIG. 6 includes a DHCP client device 102, which may be substantially similar to any of DHCP clients 20 shown with respect to the examples of FIGS. 1, 4 and 5. Network system 100 also includes a DHCP server 104 that may be substantially similar to DHCP server 16 described above with respect to the examples of FIGS. 1 and 5.

Both of subnet 22 and network 14 include a respective one of DHCP relay devices 106A, 106B ("DHCP relay devices 106"). Each of DHCP relay devices 106 may be substantially similar to DHCP relay device 12 described above with respect to the examples of FIGS. 1 and 5. Generally, DHCP relay devices 106 couple to one another indirectly in that one or more other networks similar to network 14 may be positioned between DHCP relay devices 106. This indirect coupling is illustrated in the example of FIG. 6 by a dashed line between DHCP relay devices 106. In some instances, however, DHCP relay devices 106 may directly connect to one another. DHCP relay device 106B that resides within network 14 may, in some instances, represent a transparent DHCP relay device that is substantially similar to transparent DHCP relay device 94 of network system 92 described above with respect to the example of FIG. 5. In some instances, one or more of DHCP relay devices 106 may represent a DHCP relay-proxy device that acts as a DHCP server from the perspective of DHCP client device 102 and acts as a client from the perspective of DHCP server 104. In a typically implementation there is only one DHCP relay-proxy device in a given chain of DHCP relay devices positioned between a DHCP client device and a DHCP server.

While acting as a DHCP server proxy from the perspective of DHCP client device 102 and as a DHCP client proxy from the perspective of DHCP server 104, DHCP relay-proxy devices 106 generally relay messages between DHCP client device 102 and DHCP server 104, hence the name "DHCP relay-proxy devices." DHCP relay-proxy devices 106 in this instance generally replace network addresses associated with either DHCP client device 102 or DHCP server 104 within the various messages with the network address assigned to DHCP relay devices 106 to facilitate the emulation of a DHCP server from the perspective of DHCP client device 102 and the DHCP client from the perspective of DHCP server 104. Acting as various proxies may improve response times to various DHCP messages. While described with respect to DHCP relay devices 106, the techniques may be implemented by DHCP relay-proxy devices or any other network device that maintains address bindings. The techniques therefore should not be limited in this respect to the examples set forth in this disclosure. In this respect, use of the term "relay device" in the examples that follow is intended to refer to relay devices, relay-proxy devices or any combination thereof.

Network system 100 also includes a remote authentication dial-in user service (RADIUS) server 108 ("RADIUS server 108") that implements a RADIUS protocol. RADIUS server 108 represents a network device that generally provides centralized authentication, authorization and accounting management for network devices, such as DHCP client device 102, to connect and interface with a network service. Often, RADIUS server 108 requires that these network devices, such as DHCP client device 102, respond to a challenge with credentials, such as a username and password. Upon authenticating a user based on the credentials, RADIUS server 108 then authorizes the authenticated user to access one or more network services via associated DHCP client device 102. RADIUS server 108 may also account for the use of these network services. More information regarding the RADIUS protocol can be found in request for comment (RFC) 2865, entitled "Remote Authentication Dial In User Service (RADIUS)," dated June 2000, which is hereby incorporated by reference as if fully set forth in this disclosure in its entirety.

As further shown in the example of FIG. 6, each of DHCP relay devices 106 and DHCP server 104 store data defining a respective one of address tables 110A-110C ("address tables 110"). Each of address tables 110 store one or more address bindings that identify an association or binding between a unique identifier identifying a client device, such as a hardware address or a client identifier (clientID), and a layer three network address, such as an IP address allocated by DHCP server 104 in the manner described above for use by DHCP client device 102. Generally, DHCP client device 102 includes an interface that has a hardware address referred to as a MAC address, which is a L2 address, hardcoded or hardwired into a static memory of the interface. In any event, when preparing or generating the DHCP discover message, DHCP client device 102 generally inserts either this L2 MAC address or a clientID into the DHCP discover message to uniquely identify DHCP client device 102. DHCP client device 102 broadcasts this DHCP discover message throughout subnet 22, whereupon DHCP relay device 106A receives this message in the manner noted above.

The term "unique identifier" is used in this disclosure with respect to a DHCP client to generally refer to an identifier that is unique for a given subnet in which the DHCP client resides. A L2 MAC address is often considered unique for an entire network but in some instances this is not the case. Consequently, DHCP requires only that the unique identifier be unique within any given subnet serviced by a DHCP server. For this reason, the term unique should not necessarily be construed to mean globally unique in all instances and generally refers to unique within the context of a subnet. The term "clientID" refers to a configurable client identifier that can be assigned to a given DHCP client device for use in uniquely identifying the client device within a subnet. If a client ID is defined, the DHCP relay, relay-proxy and/or server uses this as the key instead of the MAC address. If a clientID is not defined, the DHCP relay, relay-proxy and/or server uses this L2 MAC address as the key, as described below. While described in this disclosure with respect to a L2 MAC address, the techniques of this disclosure should not be limited in this respect but may be performed with respect to any type of unique identifier that uniquely identifies a DHCP client device within a subnet.

In any event, upon receiving this discover message, DHCP relay device 106A parses the L2 MAC address assigned to DHCP client device 102 from the DHCP discover message.

DHCP relay device 106A then uses this parsed L2 MAC address as a key to retrieve an entry stored to address table 110A that identifies a binding between this particular L2 MAC address and an IP address. If an entry previously exists that defines a binding between a L2 MAC address and an IP address, DHCP relay device 106A may clear the IP address from this entry as DHCP client device 102 is requesting a new IP address lease by virtue of sending the DHCP discover message. If no entry previously existed in address table 110A, DHCP relay device 106A may create a new entry in address table 110A and associate this entry with the parsed L2 MAC address. DHCP relay device 106A then forwards or relays this DHCP discover message to DHCP server 104, where DHCP relay device 106B transparently intercepts this message from the perspective of DCHP relay device 106A.

Upon intercepting this DHCP discover message, DHCP relay device 106B may perform substantially similar operations to that of DHCP relay device 106A with respect to updating or otherwise maintaining address table 110B. DHCP relay device 106B also forwards or relays this DHCP discover message to DHCP server 104, which may update its address table 110C in a similar manner to that of DHCP relay devices 106. In this way, each of DHCP relay devices 106 and DHCP server 104 may synchronize their respective address tables 110 with respect to a L2 address.

When DHCP client device 102 requests a L3 IP address offered by DHCP server 104 and DHCP server 104 responds with the acknowledgement message in the manner described above, DHCP server 104 may update the entry associated with the L2 MAC address uniquely identifying DHCP client device 102 within address table 110C to bind this MAC address to the L3 IP address offered by DHCP server 104. DHCP relay device 106B may intercept this DHCP acknowledgment message sent by DHCP server 104 and parse this message to extract the L3 IP address offered by DHCP server 104 for use by DHCP client device 102. DHCP relay device 106B may also parse the L2 MAC address that uniquely identify DHCP client device 102 from this DHCP acknowledgement message, and using this parsed L2 MAC address again as a key to retrieve the entry in address table 110B, update this entry to bind the L2 MAC address to the offered L3 IP address in a manner similar to DHCP server 104. DHCP relay device 106B forwards or relays this message to DHCP client device 102, where DHCP relay device 106A intercepts this message and performs substantially similar operations to that of DHCP relay device 106B to update the entry associated with the L2 MAC address uniquely identifying DHCP client device 102 to bind the L2 MAC address to the offered L3 IP address. In other words, DHCP relay devices 106 receive an allocation message, such as the DHCP acknowledgement message, that allocates a L3 IP address for use by DHCP client device 102 identified by a L2 MAC address. Moreover, each of DHCP relay devices 106 store data defining a binding between the L2 MAC address of the client device and the L3 IP address reserved for use by the client device. In this way, DHCP relay devices 106 and DHCP server 104 may update their respective address tables 110 to maintain synchronized bindings between L2 MAC addresses and L3 IP addresses.

DHCP relay devices 106 and DHCP server 104 generally store data to their respective address tables 110 in addition to the bindings, such as the terms of the leases for the various IP addresses offered by DHCP server 104. DHCP relay devices 106 generally also store data to address table 110 that specifies one of a plurality of interfaces of respective DHCP relay devices 106 over which DHCP relay devices 106 receive communications, such as any of the above DHCP messages, from a particular DHCP client device, such as DHCP client device 102. By storing the association between the one of the plurality of interfaces and the L2 MAC address (which again, generally represents one example of a unique identifier), DHCP relay devices 106 may forward traffic destined for DHCP client device 102, such as any of the above described DHCP messages from DHCP server 104, to the appropriate interface such that the messages are properly forwarded to DHCP client device 102.

For any number of reasons, address tables 110 may become unsynchronized. For example, as noted above, DHCP client devices are not required to fail gracefully and issue a DHCP release message to release the lease of the IP addresses reserved for use by DHCP client devices. Rather DHCP relies on a timeout feature with respect to leases to provide a failsafe when DHCP client devices do not fail gracefully, where this timeout feature removes leases not renewed before the timeout period expires. Yet, again as noted above, the size of the IPv4 address space restricts the ability of service providers to allocate IP addresses given the rapid increase in the number of network devices. When a given network device does not fail gracefully and a release message is not sent, this address, which is most likely needed by the service provider, remains reserved for use by the failed network device. In certain circumstances, such as the swap circumstances described above with respect to FIGS. 1-5, DHCP relay device 106A may determine that the swapped device is replacing the failed device and automatically generate and forward a DHCP release message on behalf of the failed or replaced network device. In this instance, DHCP relay devices 106 and DHCP server 104 may update the bindings stored in entries of address tables 110 to remove the lease and maintain synchronized bindings.

However, if DHCP relay device 106 does not implement the techniques described above with respect to FIGS. 1-5, DHCP relay device 106A may be able to determine that the failed device is no longer present in subnet 22 but be unable to communicate this in the form of a DHCP release message to DHCP relay device 106B and DHCP server 104. DHCP relay device 106A may update address table 110A to reflect the determination that the failed network device is no longer present in subnet 22, but since it does not implement the techniques described above with respect to FIGS. 1-5, DHCP relay device 106A is incapable of sending the DHCP release message. Without this release message to trigger the update of address tables 110B, 110C, DHCP relay device 106B and DHCP server 104 do not update their respective address tables 110B, 110C, resulting in unsynchronized bindings with respect to the binding stored to address tables 110.

As another example, DHCP relay device 106A may support a feature referred to as RADIUS initiated disconnect, whereby DHCP relay device 106A accepts commands from RADIUS server 108 that remove one or more bindings stored to entries of address table 110A. Commonly, not all DHCP relay devices or DHCP servers support this RADIUS initiated disconnect feature or, for that matter, provide an interface by which to interface with RADIUS server 108. Assuming only DHCP relay device 106A of DHCP relay devices 106 and DHCP server 104 provides this RADIUS initiated disconnect feature and/or an interface by which to interface with RADIUS server 108, RADIUS server 108 can only communicate with DHCP relay device 106A. Assuming further that RADIUS server 108 initiates a disconnect of DHCP client device 102 using this RADIUS initiated disconnect feature, only DHCP relay device 106A removes the binding stored to the entry of address table 110A associated with the L2 MAC address identifying DHCP client device 102, while DHCP relay device 106B and DHCP server 104 are unaware of this update to address table 110A. In this instance, address tables 110 may become unsynchronized with respect to various entries that store bindings.

As yet another example, an administrator, such as admin 98, may interface with DHCP relay device 106A to remove an entry from address table 110A, but fail to remove the corresponding entries from address tables 110B and 110C through administrative oversight or some other error, such as removing the wrong entry. In this instance, DHCP relay device 106A may remove an entry, while one or more of DHCP relay devices 106B and DHCP server 104 do not remove the corresponding entry. In this event, the entries of address tables 110 storing bindings may once again become unsynchronized. Unsynchronized address tables 110 may present a number of administrative challenges as it becomes unclear as to which of DHCP client devices 102 are actually permitted to access network 14. Unraveling errors and different capabilities to resynchronize address tables 110 across DHCP relay devices 106 and DHCP server 104 may consume significant administrative resources. Moreover, unsynchronized address tables 110 may result in substantial issues when, for example, a given network device is not permitted to access network 14 by virtue of it not being assigned a L3 IP address even though the user employing that network device is a current customer or subscriber of the services provided by the service provider.

In accordance with the techniques described in this disclosure, DHCP relay device 106A determines whether to remove the binding between the L2 MAC address of the client device and the L3 IP address reserved for use by the client device via one or more of the above stated ways, i.e., detection of a swapped device, RADIUS initiated disconnect, and/or administrative input in this example. DHCP relay device 106A then automatically generates a DHCP release message on behalf of the removed network device, e.g., DHCP client device 102, to release the binding between the L2 MAC address network address identifying DHCP client device 102 and the L3 IP address allocated for use by DHCP client device 102. DHCP relay device 106A generates this message on behalf of client device 102 by forming the message as if client device 102 had originated the message, where the client device 102 normally sets the chaddr field to the client device's hardware address or the clientID that identifies DHCP client device 102. In some instances, DHCP relay device 106A adds an option 82 field to the release message similar to the option 82 field described above and/or a "giaddr" field to the release message. DHCP relay device 106A may add these fields so that DHCP server 104 knows that the relay generated the message rather than the client device.

DHCP relay device 106A then forwards the DHCP release message to DHCP server 104 server that reserved the L3 IP address for use by DHCP client device 102 identified by the L2 MAC address. As this DHCP release message traverses each of DHCP relay devices 106B and terminates at DHCP server 104, each of DHCP relay device 106B and DHCP server 104 updates their respective address tables 110B, 110C to remove the entry associated with the L2 MAC address identified by the release message, thereby effectively preserving the synchronization across each of address tables 110.

In this manner, the techniques described in this disclosure may ensure synchronization across various network devices that store bindings between L2 addresses and L3 network addresses. By virtue of ensuring such synchronization, the techniques may reduce administrative burdens associated with manually removing bindings defined by entries of address tables 110, reduce the possibility of unintentionally manually removing the wrong entry, and otherwise promote more efficient operation of network system 100. Moreover, the techniques may improve address reuse within the address space as leases for IP addresses may be automatically released more efficiently and quickly when compared to expiration or manual or RADIUS initiated disconnect ways to release leases. For example, assuring that the release message reaches the server, as potentially provided by the techniques of this disclosure, ensures that the lease for a given one or more of IP address is released in comparison to manual or RADIUS initiated disconnect which by no means generally ensure the DHCP server actually releases the lease. In this example, by ensuring that the lease for the IP address is released, the techniques may promote reuse of the IP addresses in that the DHCP server may lease of the IP address to another network device.

Figure 7:
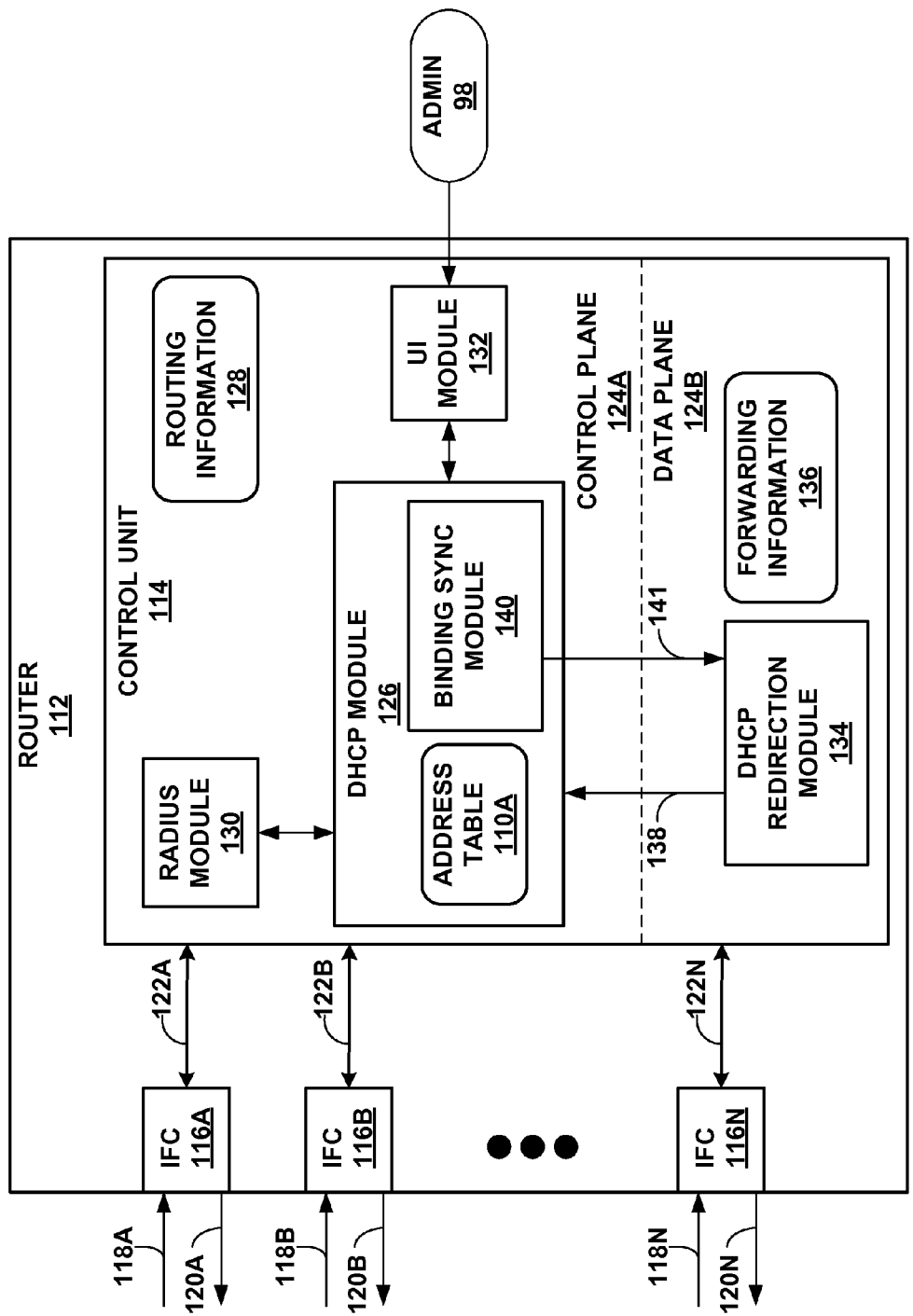
FIG. 7 is a block diagram illustrating an example router that implements the techniques described in this disclosure to automatically synchronize address bindings across various other network devices.

FIG. 7 is a block diagram illustrating an example router 112 that implements the techniques described in this disclosure to automatically synchronize address bindings across various other network devices. Router 112 is one example of a network device capable of implementing the automatic resource binding synchronization techniques described in this disclosure. Any number of other types of network devices, such as switches, hubs, gateways, wireless access points (WAPs), digital subscriber line access multiplexers (DSLAMs), cable modem termination systems (CMTS), and servers, may implement the techniques. Consequently, the techniques should not be limited to the example router 112 of FIG. 7. For purposes of illustration router 112 implements DHCP relay functionality and represents DHCP relay device 106A of FIG. 6.

Similar to router 36 described above with respect to the example of FIG. 2, router 112 includes a control unit 114 and interface cards (IFCs) 116A-116N ("IFCs 116"), where control unit 114 may be substantially similar to control unit 37 of router 36 and IFCs 116 may be substantially similar to IFCs 48 of router 36. IFCs 116, substantially similar to IFCs 48, receive and send packet flows or network traffic via inbound network links 118A-188N ("inbound network links 118") and outbound network links 120A-120N ("outbound network links 120"), respectively. IFCs 116 are typically coupled to network links 118, 120 via a number of interface ports (not shown), and forward and receive packets and control information from control unit 114 via a respective one of paths 122A-122N ("paths 122"). Each physical interface of IFCs 116 is typically assigned a unique identifier by control unit 114, and multiple logical interfaces having unique identifiers may be assigned to each physical interface, where each logical interface represents as a distinct input or output interface for different network traffic.

As shown in the example of FIG. 7, control unit 114 is divided into two logical planes, i.e., control plane 124A and data plane 124B in this example, each of which are similar to control plane 38A and data plane 38B of control unit 37 included within router 36 shown in the example of FIG. 2. Control plane 124A of control unit 114 includes a DHCP module 126 that may be substantially similar to DHCP module 44 of control unit 37. Control plane 124A of control unit 114 also stores routing information 128 that may be substantially similar to routing information 40. Control plane 124A of control unit 124A also includes a RADIUS module 130 that implements the RADIUS protocol incorporated by reference above, as well as, a user interface (UI) module 132 ("UI module 132") that presents one or more user interfaces with which a user, such as admin 98, may interact to interface with control unit 114 and, in some instances, DHCP module 126. Data plane 124B of control unit 114 includes a DHCP redirection module 134 that may be substantially similar to DHCP redirection module 46. Data plane 124B of control unit 114 also stores forwarding information 136 that is substantially similar to example forwarding information 42 described above.

DHCP module 126 receives redirected DHCP messages 138, including the DHCP discover, DHCP offer, DHCP request, and DHCP acknowledgement messages noted above. DHCP module 126 stores data defining address table 110A, which includes the one or more above noted entries that define address bindings or bindings between L2 MAC addresses identifying any given DHCP client device and L3 IP address reserved for use by the DHCP client device. DHCP module 126 generally parses various ones of DHCP messages 138 to add, remove and/or update these entries address table 110A that define these address bindings in the manner generally described above with respect to DHCP relay device 106A.

For any number of the above noted reasons, DHCP module 126 may update address table 110A such that it becomes unsynchronized with the other ones of address tables 110. For example, RADIUS module 130 may, in some instances, receive a communication that identifies one or more address bindings that should be removed through a feature referred to as RADIUS-initiated disconnect. Upon receiving this communication, RADIUS module 130 interfaces with DHCP module 126 and instructs DHCP module 126 to remove the identified address binding stored to one or more entries of address table 110A. If the other devices, i.e., DHCP relay device 106A and DHCP server 104 in this example, do not support this RADIUS-initiated disconnect feature, address tables 110 become unsynchronized across DHCP relay devices 106 and DHCP server 104.

As another example, admin 98 may interact with a user interface presented by UI module 132 to input data identifying one or more address bindings stored to entries of address table 110A. Admin 98 may also interact with this or another user interface presented by UI module 132 to input data specifying that these identified one or more address bindings are to be deleted. In response to receiving this data or input, UI module 132 may interface with DHCP module 126 to forward this data or input to DHCP module 126, which in response to this data, deletes the identified one or more address bindings from the corresponding entries of address table 110A. Should admin 98 fail to or improperly update the remaining ones of address tables 110, address tables 110 may become unsynchronized across DHCP relay devices 106 and DHCP server 104.

To overcome these synchronization issues, DHCP module 126 includes a binding synchronization module 140 ("binding sync module 140") that implements the automatic resource binding synchronization techniques described in this disclosure. Binding sync module 140 monitors address table 110A and DHCP messages 138 to determine whether bindings stored to entries of address table 110A have been removed or deleted and correlates those deletions, if possible, to receipt of one or more DHCP messages 138 that specify a binding release, which are referred to as DHCP release messages as noted above.

For those bindings that are removed and cannot be correlated to a DHCP release message, such as those triggered in response to 1) detecting a swap in accordance with the techniques described above with respect to FIGS. 1-5, 2) a RADIUS-initiated disconnect via the communication from RADIUS module 130 and 3) data received from admin 98 via a user interface presented by UI module 132, binding sync module 140 generates a DHCP release message 141 on behalf of the DHCP client device, such as DHCP client device 102 in the manner described above with respect to the example of FIGS. 1-5. Binding sync module 140 then forwards DHCP release message 141 via one of IFCs 116 and outbound communication links 120 to DHCP server 104, where DHCP relay device 106B transparently intercepts this message and updates its address table 110B in the manner described above to bring the corresponding entry that stores the binding into synchronization with address table 110A. DHCP relay device 106B then forwards the release message to DHCP server 104, which also updates its address table 110C to synchronize its address table 110C with the remaining ones of address tables 110. In this way, the techniques may facilitate automatic, e.g., without requiring any human or user intervention, resource binding synchronization across various address tables 110 stored by various network devices 104, 106.

Figure 8:
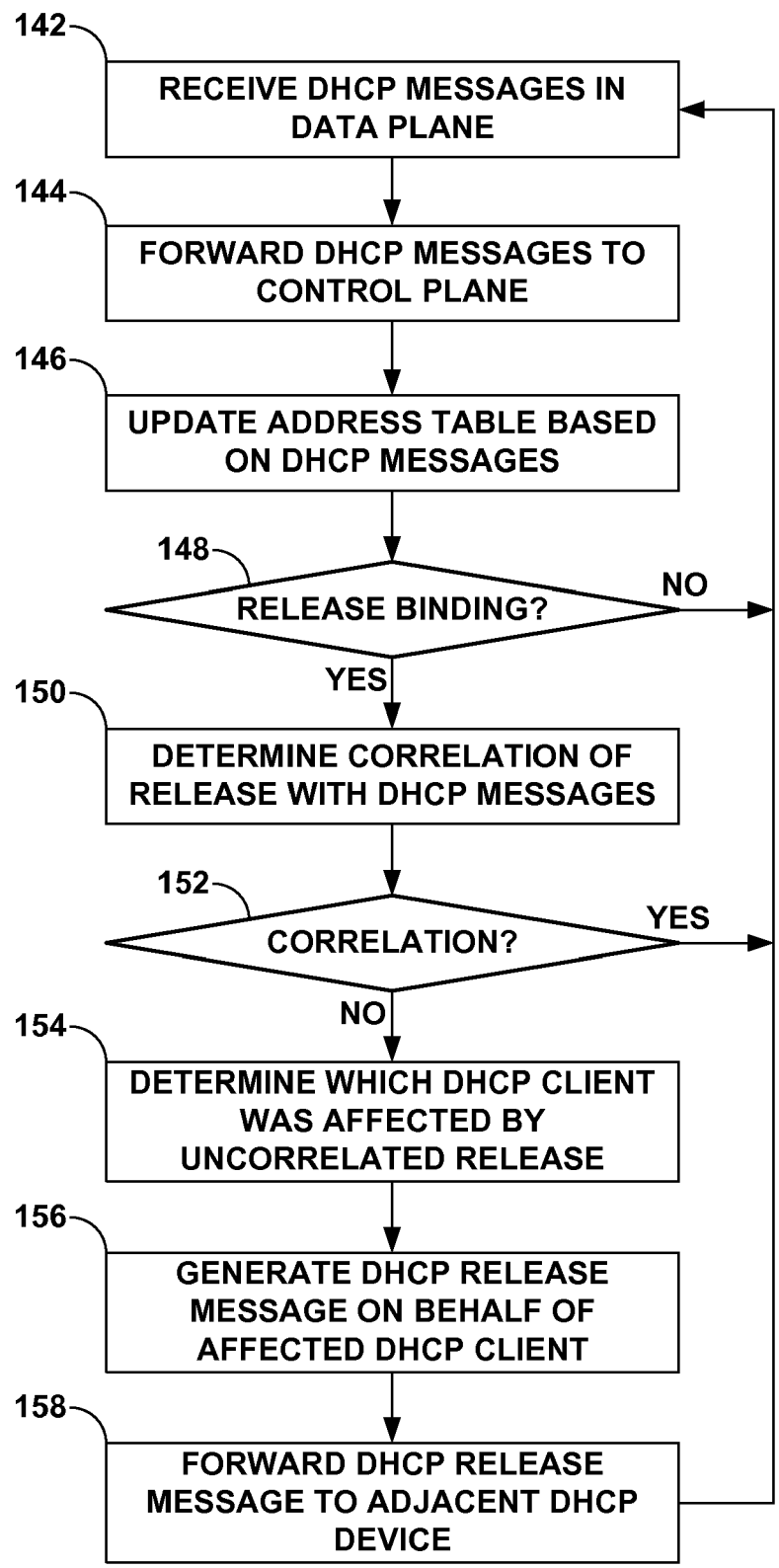
FIG. 8 is a flowchart illustrating exemplary operation of a network device in implementing the techniques described in this disclosure.

FIG. 8 is a flowchart illustrating exemplary operation of a network device, such as router 112 of FIG. 7, in implementing the techniques described in this disclosure. While described with respect to a particular network device, i.e., router 112 in this example, the techniques, as noted above, may be implemented by any network device capable of storing address bindings that bind a L2 address to a L3 network address.

Initially, IFCs 116 receive DHCP messages 138 via corresponding ones of inbound network links 118, whereupon each of IFCs 116 forward DHCP messages 138 via paths 122 to data plane 124B of control unit 114 (142). DHCP redirection module 134 intercepts forwarded DHCP messages 138 and forwards them up to control plane 124A of control unit 114 (144). DHCP module 126 receives DHCP messages 138 and updates address table 110A based on DHCP messages 138 in the manner described above (146).

Meanwhile, binding sync module 140 monitors address table 110A to determine whether DHCP module 126 releases any bindings stored to entries of address table 110A, where the term "releasing" refers to deleting any bindings stored to any entries in address table 110A (148). That is, binding synch module 140 may continually monitor address table 110A to, at some later point in time after the entries have been created to store various bindings in response to receiving DHCP message 138, determine whether one or more of the entries are about to be deleted. In some instances, DHCP module 126 may only invoke binding sync module 140 in response to deleting a binding without receiving a corresponding DHCP release message. In these instances, DHCP module 126 rather than binding sync module 140 correlates the deletions to receipt of release messages.

In other instances, as described below, binding sync module 140 actively monitors DHCP module 126 as it receives DHCP release messages and performs deletions. Binding sync module 140 may, in these instances, store or otherwise maintain data that identifies deleted bindings so that it can determine whether the deleted binding correlates to a received release message, again as noted below. If the bindings are released or deleted ("YES" 148), binding sync module 140 determines whether the released binding was stored to an entry associated with a L2 MAC address corresponding to a L2 MAC address stored to a destination MAC address field of one of DHCP messages 138 indicating a release operation. In this way, binding sync module 140 determines a correlation of the release of the binding with DHCP messages 138 (150).

If no correlation exists between DHCP messages 138 and the release of the binding stored to an entry of address table 110A ("NO" 152), such as in the above described example instances of a RADIUS-initiated disconnect or admin input, binding sync module 140 determines which DHCP client was affected by the uncorrelated release (154). That is, binding sync module 140 identifies the L2 MAC address associated with the deleted entry by monitoring the operations of DHCP module 126 or by way of DHCP module 126 informing or otherwise indicating the impacted L2 MAC address to binding sync module 140. Using this identified L2 MAC address, binding sync module 140 generates a DHCP release message 141 to synchronize the entry associated with the identified L2 MAC address in address tables 110 across DHCP relay devices 106 (where again router 112 represents DHCP relay device 106A) and DHCP server 104. In this respect, binding sync module 140 generates DHCP release message 141 on behalf of the affected DHCP client device (156). Binding sync module 140 then forwards, again on behalf of the affected DHCP client device, DHCP release message 141 to DHCP server 104, where adjacent DHCP relay device 106B transparently intercepts this message 141 and performs similar operations to those of DHCP relay device 106A.

While described above with respect to DHCP version four (DHCPv4), the techniques may be implemented with respect to DHCP version six (DHCPv6) or any other network configuration protocol. Moreover, the various modules, units and engines referred to above may be implemented as one or more hardware modules with each module, unit or engine representing independent and distinct hardware modules, or alternatively with the module, unit or engine representing a single set of hardware module that performs the operations described above with respect to the various modules, units and engines. In some instances, the one or more hardware modules execute instructions stored to a computer-readable storage medium, where these one or more hardware modules often comprise a processor. In other instances, the one or more hardware modules are dedicated hardware modules that do not involve or execute instructions. Regardless, the techniques of this disclosure should not be limited to any particular form of hardware or combinations of hardware and software.

Moreover, while described above with respect to the three exemplary ways in which address tables may become unsynchronized, i.e., a client swap, through a RADIUS-initiated disconnect and by way of administrator input, the techniques may apply in any circumstances where a DHCP binding is removed without first receiving a DHCP release message that correlates to this binding removal. Consequently, the techniques should not be limited to the exemplary ways described above.

Various embodiments of the invention have been described. These and other embodiments are within the scope of the following claims.

The invention claimed is:

1. A method comprising:
receiving, with an intermediate network device positioned between a client device and a server in a network, an allocation message from the server that allocates a layer three (L3) network address for use by the client device identified by a unique identifier;
storing, with the intermediate network device, data defining a binding between the unique identifier identifying the client device and the L3 network address reserved for use by the client device;
determining, with the intermediate network device, whether to release the binding between the unique identifier identifying the client device and the L3 network address reserved for use by the client device based on whether a communication has been received from a remote authentication dial-in user server (RADIUS) server specifying a RADIUS-initiated disconnect for the client device;
upon determining that the communication has been received from the RADIUS server specifying the RADIUS-initiated disconnect for the client device, determining, with the intermediate network device, that the a binding release did not occur in response to receiving a release message from the client device;
automatically generating, with the intermediate network device, a release message on behalf of the client device upon determining that the binding release did not occur in response to receiving a release message from the client device; and
outputting, with the intermediate network device, the automatically generated release message to the server that reserved the L3 network address for use by the client device identified by the unique identifier.

2. The method of claim 1,
wherein the intermediate network device comprises a dynamic host configuration protocol (DHCP) relay device that implements one of DHCP version four (DHCPv4) and DHCP version 6 (DHCPv6),
wherein the client device comprises a DHCP client device and the server comprises a DHCP server,
wherein receiving the allocation message includes receiving a DHCP acknowledgement message from the DHCP server that allocates the L3 network address as an Internet protocol (IP) address,
wherein the method further comprises determining whether the binding release occurs in response to receiving a DHCP release message from the client device,
wherein automatically generating a release message on behalf of the client device comprises automatically generating a DHCP release message on behalf of the DHCP client device, and
wherein outputting the automatically generated release message comprises outputting the automatically generated DHCP release message to the DHCP server that reserved the IP address for use by the DHCP client device identified by the unique identifier.

3. The method of claim 1, further comprising:
determining whether the binding release occurs in response to receiving the release message from the client device so as to detect whether the client device has not failed gracefully; and
automatically generating another release message on behalf of the client device upon detecting that the client device has not failed gracefully.

4. The method of claim 1, further comprising:
receiving, with the intermediate network device, a message from the client device requesting that the L3 network address be reserved for the client device, wherein the message includes the unique identifier that uniquely identifies the client device and additional context information that identifies a context in which the client device operates;
receiving, with the intermediate network device, a message from a second client device, the message requesting that a L3 network address be reserved for use by the second client device, wherein the message from the second client device includes an identifier that uniquely identifies the second client device and additional context information that identifies a context in which the second client device operates; and
determining, with the network device, whether the additional context information included within each of the first and the second messages is the same and indicates that the client device and the second client device operate in the same context.

5. The method of claim 4, wherein the context identifies a respective subnet for the client devices.

6. The method of claim 4, wherein the additional context information identifies a vendor and a network circuit associated with each of the client devices.

7. The method of claim 4,
wherein the messages received from the client device and the second client device comprise Dynamic Host Configuration Protocol (DHCP) discover messages that each include an option 60 field that defines a first portion of the additional context information to identify a vendor of the respective client device,
wherein the method further comprises updating, with the network device, the DHCP discover messages by adding to each of the DHCP discover messages an option 82 field that defines a second portion of the additional context information to identify a circuit by which the network device received the respective DHCP discover message, and
wherein determining that the additional information included within each of the first and second messages is the same includes determining whether the first and second portions of the additional context information defined by the option 60 and option 82 fields of any two of the messages received from the client devices are the same.

8. The method of claim 1, further comprising automatically generating another release message on behalf of the client device in response to determining that input data has been received via a user interface that identifies the client device for removal from the network.

9. The method of claim 1, further comprising updating the data storing the data defining the binding to release the binding in response to the determination to release the binding regardless of the determination of whether the binding release occurs in response to receiving a release message from the client device.

10. The method of claim 1, further comprising:
receiving a release message from the client device specifying that the binding should be released;
updating the data in response to receiving the release message from the client device to release the binding,
wherein determining whether the binding release occurs in response to receiving a release message from the client device comprises determining that the binding release occurs in response to receiving the release message from the client device; and
forwarding the release message received from the client device to the server rather than automatically generating the release message on behalf of the client device and forwarding the automatically generated release message to the server.

11. The method of claim 1, wherein outputting the automatically generated release message to the server comprises forwarding the automatically generated release message to the server to synchronize the binding stored as data by the intermediate network device with corresponding bindings stored by the server and other intermediate network devices positioned between the intermediate network device and the server.

12. The method of claim 1, wherein the intermediate network device comprises a router.

13. The method of claim 1, wherein the unique identifier comprises one of a L2 hardware address and a client identifier.

14. The method of claim 1, further comprising adding one of an option 82 and giaddr field to the automatically generated release message prior to outputting the automatically generated release message.

15. An intermediate network device positioned between a client device and a server in a network, the intermediate network device comprising:
at least one interface card that receives an allocation message from the server that allocates a layer three (L3) network address for use by the client device identified by a unique identifier;
a control unit that stores data defining a binding between the unique identifier identifying the client device and the L3 network address reserved for use by the client device,
wherein the control unit includes a binding synchronization module that determines whether to release the binding between the unique identifier identifying the client device and the L3 network address reserved for use by the client device based on whether a communication has been received from a remote authentication dial-in user server (RADIUS) server specifying a RADIUS-initiated disconnect for the client device, determines, upon determining that the communication has been received from the RADIUS server specifying the RADIUS-initiated disconnect for the client device, that the binding release did not occur in response to receiving a release message from the client device, automatically generates a release message on behalf of the client device in response to determining that the binding release did not occur in response to receiving a release message from the client device, and outputs the automatically generated release message to the server that reserved the L3 network address for use by the client device identified by the unique identifier.

16. The intermediate network device of claim 15,
wherein the intermediate network device comprises a dynamic host configuration protocol (DHCP) relay device that implements one of DHCP version four (DHCPv4) and DHCP version 6 (DHCPv6),
wherein the client device comprises a DHCP client device,
wherein the server comprises a DHCP server,
wherein the at least one interface card receives a DHCP acknowledgement message from the DHCP server that allocates the L3 network address as an Internet protocol (IP) address,
wherein the binding synchronization module determines whether the binding release occurs in response to receiving a DHCP release message from the client device, automatically generates a DHCP release message on behalf of the DHCP client device, and outputs the automatically generated DHCP release message to the DHCP server that reserved the IP address for use by the DHCP client device identified by the unique identifier.

17. The intermediate network device of claim 15, wherein the binding synchronization module determines whether the binding release occurs in response to receiving the release message from the client device so as to detect whether the client device has not failed gracefully and automatically generates the release message on behalf of the client device upon detecting that the client device has not failed gracefully.

18. The intermediate network device of claim 15,
wherein the at least one interface card receives a message from the client device requesting that the L3 network address be reserved for the client device, wherein the message includes the unique identifier that uniquely identifies the client device and additional context information that identifies a context in which the client device operates; and wherein the at least one interface card also receives a message from a second client device, the message requesting that a L3 network address be reserved for use by the second client device, wherein the message from the second client device includes an identifier that uniquely identifies the second client device and additional context information that identifies a context in which the second client device operates, wherein the binding synchronization module determines whether the additional context information included within each of the first and the second messages is the same and indicates that the client device and the second client device operate in the same context.

19. The intermediate network device of claim 18, wherein the context identifies a respective subnet for the client devices.

20. The intermediate network device of claim 18, wherein the additional context information identifies a vendor and a network circuit associated with each of the client devices.

21. The intermediate network device of claim 18,
wherein the messages received from the client device and the second client device comprise Dynamic Host Configuration Protocol (DHCP) discover messages that each include an option 60 field that defines a first portion of the additional context information to identify a vendor of the respective client device, wherein the control unit includes a DHCP module that updates the DHCP discover messages by adding to each of the DHCP discover messages an option 82 field that defines a second portion of the additional context information to identify a circuit by which the network device received the respective DHCP discover message, and wherein the binding synchronization module determines whether the first and second portions of the additional context information defined by the option 60 and option 82 fields of any two of the messages received from the client devices are the same.

22. The intermediate network device of claim 15, wherein binding synchronization module automatically generates another release message on behalf of the client device in response to determining that input data has been received via a user interface that identifies the client device for removal from the network.

23. The intermediate network device of claim 15, wherein the control unit updates the data storing the data defining the binding to release the binding in response to the determination to release the binding regardless of the determination of whether the binding release occurs in response to receiving a release message from the client device.

24. The intermediate network device of claim 15,
wherein the at least one interface card receives a release message from the client device specifying that the binding should be released;

wherein the control unit updates the data in response to receiving the release message from the client device to release the binding, wherein the binding synchronization module determines that the binding release occurs in response to receiving the release message from the client device, and forwards the release message received from the client device to the server rather than automatically generate the release message on behalf of the client device and forwarding the automatically generated release message to the server.

25. The intermediate network device of claim 15, wherein binding synchronization module outputs the automatically generated release message to the server to synchronize the binding stored as data by the intermediate network device with corresponding bindings stored by the server and other intermediate network devices positioned between the intermediate network device and the server.

26. The intermediate network device of claim 15, wherein the intermediate network device comprises a router.

27. The intermediate network device of claim 15, wherein the unique identifier comprises one of a L2 hardware address and a client identifier.

28. The intermediate network device of claim 15, wherein the binding synchronization module adds one of an option 82 and giaddr field to the automatically generated release message prior to outputting the automatically generated release message.

29. A network system comprising:
a remote dial in user service (RADIUS) server;
a dynamic host configuration protocol (DHCP) client;
a DHCP server that allocates L3 network addresses for use by DHCP clients;
at least one DHCP relay device positioned between the DHCP client device and the DHCP server, the at least one DHCP relay device comprising:
at least one interface card that receives a DHCP message from the DHCP server allocating a layer three (L3) network address for use by the DHCP client device identified by a unique identifier;
a control unit that stores data defining a binding between the unique identifier identifying the DHCP client device and the L3 network address reserved for use by the DHCP client device,
wherein the control unit includes a binding synchronization module that determines whether to release the binding between the unique identifier identifying the DHCP client device and the L3 network address reserved for use by the DHCP client device based on whether a communication has been received from the RADIUS server specifying a RADIUS-initiated disconnect for the DHCP client device, determines, upon determining that the communication has been received from the RADIUS server specifying the RADIUS-initiated disconnect for the DHCP client device, that the binding release did not occur in response to receiving a DHCP release message from the DHCP client device, automatically generates a DHCP release message on behalf of the client device in response to determining that the binding release did not occur in response to receiving a DHCP release message from the DHCP client device, and outputs the automatically generated DHCP release message to the DHCP server that reserved the L3 network address for use by the DHCP client device identified by the unique identifier.

30. The network system of claim 29, wherein each of the DHCP client, the DHCP server and the at least one DHCP relay device implement one or more of DHCP version 4 (DHCPv4) and DHCP version 6 (DHCPv6).

31. A non-transitory computer-readable storage medium comprising instructions that cause a processor to:
receive, with an intermediate network device positioned between a client device and a server in a network, an allocation message from the server that allocates a layer three (L3) network address for use by the client device identified by a unique identifier;

store, with the intermediate network device, data defining a binding between the unique identifier identifying the client device and the L3 network address reserved for use by the client device;

determine, with the intermediate network device, whether to release the binding between the unique identifier identifying the client device and the L3 network address reserved for use by the client device based on whether a communication has been received from a remote authentication dial-in user server (RADIUS) server specifying a RADIUS-initiated disconnect for the client device;

upon determining that the communication has been received from the RADIUS server specifying the RADIUS-initiated disconnect for the client device, determine, with the intermediate network device, that the binding release did not occur in response to receiving a release message from the client device;

automatically generate, with the intermediate network device, a release message on behalf of the client device upon determining that the binding release did not occur in response to receiving a release message from the client device; and output, with the intermediate network device, the automatically generated release message to the server that reserved the L3 network address for use by the client device identified by the unique identifier.

* * * * *